(12) United States Patent
Hilewitz et al.

(10) Patent No.: US 12,554,644 B2
(45) Date of Patent: Feb. 17, 2026

(54) HIERARCHICAL CORE VALID TRACKER FOR CACHE COHERENCY

(71) Applicant: Intel Corporation, Santa Clara, CA (US)

(72) Inventors: Yedidya Hilewitz, Sharon, MA (US); Monam Agarwal, Lynnwood, WA (US); Yen-Cheng Liu, Portland, OR (US); Alexander Heinecke, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 720 days.

(21) Appl. No.: 17/852,189

(22) Filed: Jun. 28, 2022

(65) Prior Publication Data
US 2023/0418750 A1    Dec. 28, 2023

(51) Int. Cl.
*G06F 12/0815* (2016.01)
*G06F 12/0811* (2016.01)
*G06F 12/0817* (2016.01)
*G06F 12/084* (2016.01)

(52) U.S. Cl.
CPC ...... *G06F 12/0815* (2013.01); *G06F 12/0811* (2013.01); *G06F 12/0817* (2013.01); *G06F 12/0824* (2013.01); *G06F 12/084* (2013.01)

(58) Field of Classification Search
None
See application file for complete search history.

(56) References Cited

U.S. PATENT DOCUMENTS

| | | | |
|---|---|---|---|
| 10,534,687 B2 | 1/2020 | Fahim et al. | |
| 2013/0132678 A1* | 5/2013 | Hosokawa | G06F 12/084 711/130 |
| 2016/0092366 A1* | 3/2016 | Pal | G06F 12/0875 711/125 |
| 2016/0224468 A1* | 8/2016 | Deshpande | G06F 12/0815 |
| 2016/0283374 A1* | 9/2016 | Pal | G06F 12/084 |
| 2017/0277571 A1* | 9/2017 | Yoo | G06F 9/5027 |
| 2019/0026225 A1* | 1/2019 | Gu | G06F 12/0817 |
| 2023/0139212 A1* | 5/2023 | Randall | G06F 12/0833 711/118 |

* cited by examiner

*Primary Examiner* — Kaushikkumar M Patel
(74) *Attorney, Agent, or Firm* — Essential Patents Group, LLP

(57) ABSTRACT

Techniques and mechanisms to provide hierarchical core valid tracking. In an embodiment, an apparatus comprises a cache to store information accessible by two or more cores, and circuitry coupled to the cache to maintain coherence of the information stored in the cache. The circuitry is further to hierarchically track respective associations of the information stored in the cache with the two or more cores. In another embodiment, a lowest hierarchical level of the hierarchically tracked associations is to indicate a logical core identifier of a particular core of the two or more cores.

18 Claims, 20 Drawing Sheets

| BIT | DESCRIPTION |
|---|---|
| 0 | CLUSTER[0] |
| 1 | CLUSTER[1] |
| 2 | CLUSTER[2] |
| 3 | CLUSTER[3] |
| 4 | CLUSTER[4] |
| 5 | CLUSTER[5] |
| 6 | SUB_CLUSTER[0] |
| 7 | SUB_CLUSTER[1] |
| 8 | SC0_RELATIVE_LOGICAL_ID[0]/SC1_RELATIVE_LOGICAL_ID[15] |
| 9 | SC0_RELATIVE_LOGICAL_ID[1]/SC1_RELATIVE_LOGICAL_ID[14] |
| 10 | SC0_RELATIVE_LOGICAL_ID[2]/SC1_RELATIVE_LOGICAL_ID[13] |
| 11 | SC0_RELATIVE_LOGICAL_ID[3]/SC1_RELATIVE_LOGICAL_ID[12] |
| 12 | SC0_RELATIVE_LOGICAL_ID[4]/SC1_RELATIVE_LOGICAL_ID[11] |
| 13 | SC0_RELATIVE_LOGICAL_ID[5]/SC1_RELATIVE_LOGICAL_ID[10] |
| 14 | SC0_RELATIVE_LOGICAL_ID[6]/SC1_RELATIVE_LOGICAL_ID[9] |
| 15 | SC0_RELATIVE_LOGICAL_ID[7]/SC1_RELATIVE_LOGICAL_ID[8] |
| 16 | SC0_RELATIVE_LOGICAL_ID[8]/SC1_RELATIVE_LOGICAL_ID[7] |
| 17 | SC0_RELATIVE_LOGICAL_ID[9]/SC1_RELATIVE_LOGICAL_ID[6] |
| 18 | SC0_RELATIVE_LOGICAL_ID[10]/SC1_RELATIVE_LOGICAL_ID[5] |
| 19 | SC0_RELATIVE_LOGICAL_ID[11]/SC1_RELATIVE_LOGICAL_ID[4] |
| 20 | SC0_RELATIVE_LOGICAL_ID[12]/SC1_RELATIVE_LOGICAL_ID[3] |
| 21 | SC0_RELATIVE_LOGICAL_ID[13]/SC1_RELATIVE_LOGICAL_ID[2] |
| 22 | SC0_RELATIVE_LOGICAL_ID[14]/SC1_RELATIVE_LOGICAL_ID[1] |
| 23 | SC0_RELATIVE_LOGICAL_ID[15]/SC1_RELATIVE_LOGICAL_ID[0] |
| 24 | CV(HIOP/CXL.$) |
| 25 | MODE=1 |

FIG. 1

| SHARING CORES GROUP | SHARING TYPE | CLUSTER VECTOR | CLUSTER HALF | RELATIVE LOGICAL ID | SNOOP COUNT |
|---|---|---|---|---|---|
| 0-3 | SEQUENTIAL | 000001 | 01 | 0000000000001111 | 4 |
| 4-7 | | 000001 | 01 | 0000000011110000 | 4 |
| 8-11 | | 000001 | 01 | 0000111100000000 | 4 |
| 12-15 | | 000001 | 11 | 1111000000000000 | 5 |
| 0,4,8,12,16,20, 24,28,32,36,40, 44,48,52,56,60, 64,68,72,76,80, 84,88,92 | STRIDED | 001111 | 11 | 0001000100010001 | 28 |
| 1,5,9,13,17,21, 25,29,33,37,41, 45,49,53,57,61, 65,69,73,77,81, 85,89,93 | | 001111 | 11 | 1000101001100010 | 40 |

FIG. 3

ID TRACKER
HIERARCHICAL CORE VALID TRACKER FOR CACHE COHERENCY

BACKGROUND

In computing, a processor, a core, or a central processor unit (CPU) may be incorporated together with numerous other computing modules that together make up a computing system. In some systems, a northbridge is connected directly to a CPU via a front-side bus (FSB) to handle high-performance tasks, and may be used together with a southbridge that manages communication between the CPU and other parts of the computing system. In some systems, the functions performed by a northbridge may be incorporated into other components. For example, some CPUs may include memory controllers, graphic controllers, etc., integrated into the CPU. In some systems, uncore may refer to functions of a computing system that are not in the core, but that are closely connected to the core to achieve high performance Example uncore components may include a cache box (C-box), a unified last level cache (LLC), an arbitration unit, and an integrated memory controller (IMC). The LLC may have multiple slices and the C-box may provide cache coherency for the LLC. In some systems, a system agent may provide functions similar to northbridge and/or uncore functions. For example, a cache agent may provide cache coherency for a shared LLC.

BRIEF DESCRIPTION OF DRAWINGS

Various examples in accordance with the present disclosure will be described with reference to the drawings, in which:

FIG. 1 is an illustrative diagram of an example of a data structure for a format of an entry of a core valid directory or array in one implementation.

FIG. 3 is an illustrative diagram of an example of logical core valid generation in one implementation.

DETAILED DESCRIPTION

Figure 2:
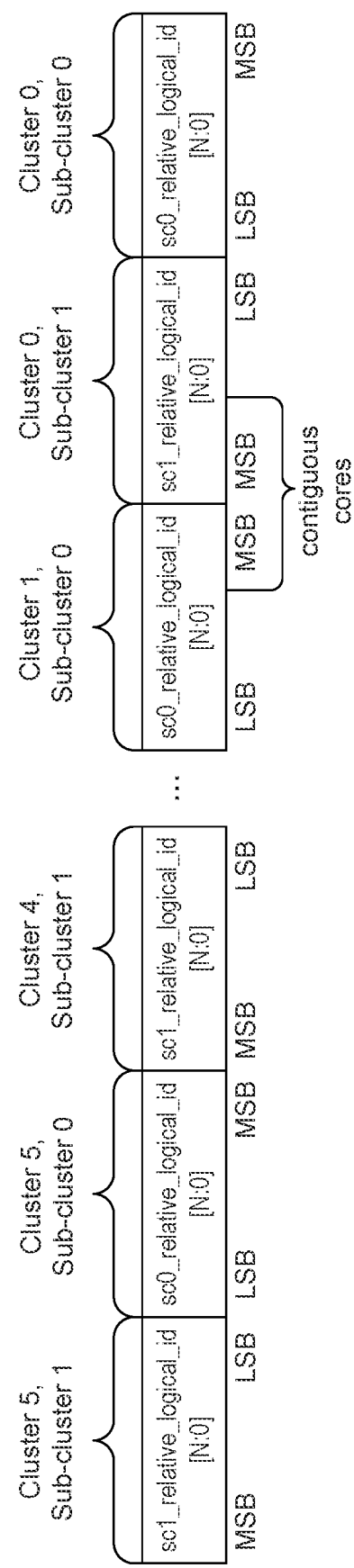
FIG. 2 is an illustrative diagram of an example of how to replicate a core vector for the data structure of FIG. 1.

The present disclosure relates to methods, apparatus, systems, and non-transitory computer-readable storage media for hierarchical core valid (CV) tracker technology for cache coherency. According to some examples, the technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to provide hierarchical tracking of CV information for shared caches and/or snoop filters.

In the following description, numerous details are discussed to provide a more thorough explanation of the examples of the present disclosure. It will be apparent to one skilled in the art, however, that examples of the present disclosure may be practiced without these specific details. In other instances, well-known structures and devices are shown in block diagram form, rather than in detail, in order to avoid obscuring examples of the present disclosure.

Note that in the corresponding drawings of the examples, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary examples to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the examples of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Some implementations provide technology for hierarchical tracking of CV information for shared caches and/or snoop filters. Conventionally, multiple core processors/systems may employ some form of coarse-grained CV tracking. CV tracking for processors has substantially increased in complexity over previous processor generations. Advances according to Moore's law have resulted in processors being able to host significantly more complex functionality integrated on a single die. This includes significant increases in core count, cache sizes, memory channels, and external interfaces (e.g., chip-to-chip coherent links and input/output (I/O) links) as well as significantly more advanced reliability, security, and power management capabilities. This increase in microarchitectural complexity has not been matched with corresponding improvements in CV tracking mechanisms. Accordingly, excessive and unneeded cache/snoop traffic volume causes both application and workload performance to suffer. This problem particularly affects cache agents and other complex logic blocks where finer grained CV tracking is not practical due to limitations in the CV tracking techniques and the resources allotted to CV tracking.

A last level cache (LLC) or snoop filter may employ a data structure such as a directory or a CV array to track core ownership of cache lines to maintain coherency. Workloads that exhibit extensive data sharing require tracking high number of cores in a single CV entry. As the core count has grown in each generation, precise tracking of the cores becomes more challenging due to the area impact from increasing the size of the CV array and the timing impact of manipulating a wide CV vector. Moreover, given transitions towards a full System-On-Chip (SoC) development model for processors (e.g., server processors), the ability to support a larger number of SoCs (including many product derivatives) with improved CV tracking is important. Some implementations may address or overcome one or more of the foregoing problems.

Some implementations provide technology for topology independent cache line tracking in a mesh-based coherent fabric. To deal with ever larger SoCs and to enable an efficient snoop broadcast, a conventional processor may employ topological-based tracking. However, a problem with topological-based tracking is that such tracking may be imprecise and/or opaque to software. Certain sharing patterns may lead to snoop-all-cores or snoop-most-cores behavior on cache line invalidation, even with relatively few cores sharing the line. Such behavior may lead to oversubscription of the invalidation and response fabric channels, leading to substantial overall fabric bandwidth loss and performance degradation.

In the context of artificial intelligence (AI) (e.g., deep learning), CV tracking is important because the most prominent and dominant computational pattern is matrix multiplication. For example, $N^3$ computational (fused multiply add) operations may be performed on $N^2$ data elements and multi-way sharing of each cache-line may naturally be used in the process. As the application of deep neural networks (DNNs) chains such operations together, the entire cache hierarchy may eventually fill up on all levels with lines that are shared among a larger set of cores. With conventional CV tracking, back invalidating cores when lines must be dropped from the LLC or even higher hierarchy cache levels has a high overhead cost due a much larger than needed invalidation traffic volume. Excessive, unneeded invalidation traffic volume causes both application and workload performance to suffer significantly.

As noted above, because of the large number of cores to track, a conventional processor may utilize a coarse-grained CV tracking scheme. Examples of conventional coarse-grained CV tracking schemes include a fixed bucketing of cores (e.g., given N CV bits, each bit tracks a floor of logical core id/N) and topological-based tracking. In a conventional topological-based approach to track multiple cores, the CV array tracks rows of the mesh fabric. When even a single core located on that row shares the line and is a snoop target, that entire row (i.e., all the cores on that row) is marked as sharing the line. In a multi-die SoCs, for example, topological-based CV tracking may track the cross product of row and dies (e.g., all the cores on the marked rows on each marked die are seen as sharing the line). Both the fixed bucketing and topological approach may be coarse-grained because the minimum unit of tracking is an entire bucket of cores or an entire row of cores. Another problem, for a device that supports multiple stock keeping units (SKUs), is that the CV data structure is defined to support the largest SKU and CV bits may go unused in smaller SKUs with fewer cores, rows or dies. While the format could be made flexible (as a function of SKU), this incurs extra design complexity, which we have avoided.

Another problem is that topological tracking is completely agnostic of software (SW) thread allocation. SW sees a logical core ID (not the same as the mesh fabric view of the logical core ID) and groups cores sharing data based on that. The logical core ID assignment has no set physical relationship, as assignment to physical locations is a function of core/slice disable per part. The final physical coordinates of each logical ID are not exposed to SW. Consequently, the cases in which one or few cores per row share the line, become unavoidable and common.

Some implementations overcome one or more of the foregoing problems. Some examples provide technology for hierarchical, topology-independent CV tracking, that allows for increased fine-grained tracking of multiple sharers and is more compatible with SW sharing patterns. In some examples, a CV tracking format employs hierarchical tracking of cores. In one example, the lowest level of a hierarchy is a bit vector precisely tracking logical core IDs, and upper levels of hierarchies specify how to replicate the bit vector to provide coverage for all cores in the system. In some examples, the levels of hierarchy in the CV tracking format may map to the SW-visible clustering or subdivision of a SoC. An example CV tracking format may utilize a bit vector representing individual cores at its lowest level of tracking, advantageously removing coarseness from the tracking. If SW assigns adjacent logical cores to share a cache line, the adjacent logical cores are precisely tracked. The hierarchical nature of the CV tracking format matches the SW view of clustering, enabling strided sharing of lines to sometimes alias to the same bits in the bit vector, minimizing false tracking and useless snoops. Examples of a hierarchical CV tracking format may further advantageously make the CV tracking independent of a physical topology of the SKU. Advantageously, some implementations of hierarchical CV tracking may provide better precision as compared to conventional CV tracking techniques.

FIG. 1 shows an example data structure 100 for a format of an entry of a CV directory or array. The CV entry format includes fields that describe three levels of hierarchy. A cluster field 110 that corresponds to a highest level of hierarchy includes six cluster bits in CV[5:0]. A sub-cluster field 112 that corresponds to a middle level of hierarchy includes two sub-cluster bits in CV[7:6]. A relative logical ID field 114 that corresponds to a lowest level of hierarchy includes a 16 bit core tracking vector in CV[23:8]. In this example, the cluster bits record those clusters that have cores sharing the line, the sub-cluster bits indicate, in aggregate, the subdivisions of those clusters that have cores sharing the line, and the relative logical id list records the cores, in aggregate, across all of the sub-clusters that are sharing the line.

The example CV entry format further includes an additional sharing field 122 that includes one bit CV[24] to track any sharing by the Host I/O Processor (HIOP, e.g., PCIE devices) or CXL cache devices. The example CV entry format further includes an additional mode field 124 that includes one bit CV[25] to switch between a first mode that records the noted CV entry format and a second mode that records up to two full logical IDs. The example data structure 100 with an array of entries (e.g., an entry per cache line) where each entry has the described CV entry format may be particularly useful for a multiprocessor system (e.g., a SoC) that supports 128 cores or more split into up to 6 clusters. Those skilled in the art will appreciate that the specifics of the hierarchical CV entry format may be adjusted for the parameters of other systems/SoCs, with more or fewer levels of hierarchy, more or fewer cluster subdivisions, smaller relative logical id list, etc.

FIG. 2 shows an example of how to replicate the core vector to cover all cores in an example SoC with six clusters and two sub-clusters, where N corresponds to the sub-cluster size minus one (e.g., N=sub-cluster size−1). In this example, the relative logic id list is used only if the specific {cluster, sub-cluster} bits are both set. Otherwise, no cores in that sub-cluster are tracked.

The core vector bits track relative logical ID per sub-cluster. For example, the SW programs the number of clusters, the base ID of each cluster, and the number of cores per cluster. Cache coherency controller hardware (HW) (e.g., a caching agent or CHA) derives the base ID of each cluster subdivision. To add a new logical ID to the corresponding entry in the CV array, the CHA computes which cluster and sub-cluster the derived base ID falls in and subtracts the appropriate sub-cluster base ID to obtain the relative logical ID. The CHA/cache coherency controller hardware HW then sets the cluster, sub-cluster and relative logic ID in the corresponding entry in the CV array to record the new core sharing the line.

As shown in FIG. 2, not all 16 bits of the vector are used (e.g., indicated by the usage of [N:0], where N generally is less than 15). Only up to the sub-cluster size bits are used. As is further shown in FIG. 2, the sub-cluster[1] (sc1) relative logical ID list is reversed as compared to the sub-cluster[0] (sc0) relative logical ID list. If a contiguous set of cores spanning a sub-cluster boundary is sharing a cache line, the bits used to track those cores will overlap (e.g., as shown by the alternating positions of the most significant bit (MSB) and least significant bit (LSB) in FIG. 2) and advantageously cause less false aliasing than if the list for both sub-clusters was in the same order and tracking wrapped back to the other end of the list. Another benefit is that if there are fewer than 16 cores per cluster sub-cluster, then there is less overlap in the tracking with a reversed list, again causing less false aliasing. In some examples, if more than two sub-clusters are used, then the relative_logical_id lists may alternate between in-order and reverse-order.

FIG. 3 shows an example of logical CV generation in a topology with 4 clusters, 2 sub-cluster bits and 16 bits of relative logical id. In this example, the cluster size is 26, the sub-cluster size is 13, four sequential cores share a cache line, and subsequently every fourth core share a cache line (e.g., strided). FIG. 3 shows examples of the values of the cluster/sub-cluster/relative logical id vectors generated for different sequential and strided sharing patterns and some example target groups.

Figure 4:
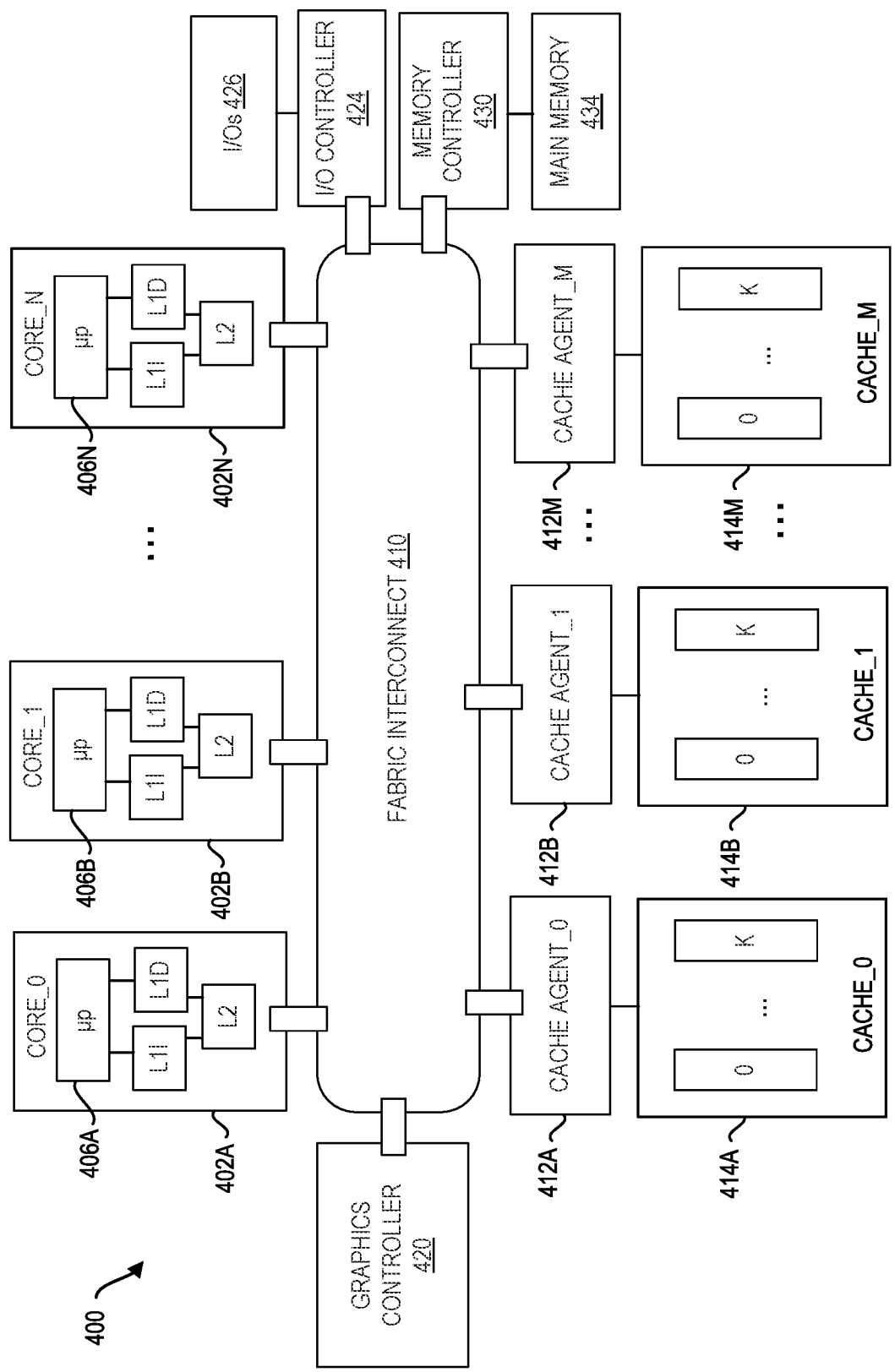
FIG. 4 is a block diagram of an example of a processor that includes hierarchical core valid tracker (HCVT) technology in one implementation.

FIG. 4 is a block diagram of a processor 400 with a plurality of cache agents 412 and caches 414 in accordance with certain examples. In a particular example, processor 400 may be a single integrated circuit, though it is not limited thereto. The processor 400 may be part of a SoC in various examples. The processor 400 may include, for example, one or more cores 402A, 402B . . . 402N (collectively, cores 402). In a particular example, the cores 402 may include a corresponding microprocessor 406A, 406B, or 406N, level one instruction (L1I) cache, level one data cache (L1D), and level two (L2) cache. The processor 400 may further include one or more cache agents 412A, 412B . . . 412M (any of these cache agents may be referred to herein as cache agent 412), and corresponding caches 414A, 414B . . . 414M (any of these caches may be referred to as cache 414). In a particular example, a cache 414 is a last level cache (LLC) slice. An LLC may be made up of any suitable number of LLC slices. Each cache may include one or more banks of memory that corresponds (e.g., duplicates) data stored in system memory 434. The processor 400 may further include a fabric interconnect 410 comprising a communications bus (e.g., a ring or mesh network) through which the various components of the processor 400 connect. In one example, the processor 400 further includes a graphics controller 420, an I/O controller 424, and a memory controller 430. The I/O controller 424 may couple various I/O devices 426 to components of the processor 400 through the fabric interconnect 410. Memory controller 430 manages memory transactions to and from system memory 434.

The processor 400 may be any type of processor, including a general purpose microprocessor, special purpose processor, microcontroller, coprocessor, graphics processor, accelerator, field programmable gate array (FPGA), or other type of processor (e.g., any processor described herein). The processor 400 may include multiple threads and multiple execution cores, in any combination. In one example, the processor 400 is integrated in a single integrated circuit die having multiple hardware functional units (hereafter referred to as a multi-core system). The multi-core system may be a multi-core processor package, but may include other types of functional units in addition to processor cores. Functional hardware units may include processor cores, digital signal processors (DSP), image signal processors (ISP), graphics cores (also referred to as graphics units), voltage regulator (VR) phases, input/output (I/O) interfaces (e.g., serial links, DDR memory channels) and associated controllers, network controllers, fabric controllers, or any combination thereof.

System/main memory 434 stores instructions and/or data that are to be interpreted, executed, and/or otherwise used by the cores 402A, 402B . . . 402N. The cores 402 may be coupled towards the system memory 434 via the fabric interconnect 410. In some examples, the system memory 434 has a dual-inline memory module (DIMM) form factor or other suitable form factor.

The system memory 434 may include any type of volatile and/or non-volatile memory. Non-volatile memory is a storage medium that does not require power to maintain the state of data stored by the medium. Nonlimiting examples of non-volatile memory may include any or a combination of: solid state memory (such as planar or 3D NAND flash memory or NOR flash memory), 3D crosspoint memory, byte addressable nonvolatile memory devices, ferroelectric memory, silicon-oxide-nitride-oxide-silicon (SONOS) memory, polymer memory (e.g., ferroelectric polymer memory), ferroelectric transistor random-access memory (Fe-TRAM) ovonic memory, nanowire memory, electrically erasable programmable read-only memory (EEPROM), a memristor, phase change memory, Spin Hall Effect Magnetic RAM (SHE-MRAM), Spin Transfer Torque Magnetic RAM (STTRAM), or other non-volatile memory devices.

Volatile memory is a storage medium that requires power to maintain the state of data stored by the medium. Examples of volatile memory may include various types of random-access memory (RAM), such as dynamic random-access memory (DRAM) or static random-access memory (SRAM). One particular type of DRAM that may be used in a memory array is synchronous dynamic random-access memory (SDRAM). In some examples, any portion of system memory 434 that is volatile memory can comply with JEDEC standards including but not limited to Double Data Rate (DDR) standards, e.g., DDR3, 4, and 5, or Low Power DDR4 (LPDDR4) as well as emerging standards.

A cache (e.g., cache 414) may include any type of volatile or non-volatile memory, including any of those listed above. Processor 400 is shown as having a multi-level cache architecture. In one example, the cache architecture includes an on-die or on-package L1 and L2 cache and an on-die or on-chip LLC (though in other examples the LLC may be off-die or off-chip) which may be shared among the cores 402A, 402B, . . . 402N, where requests from the cores are routed through the fabric interconnect 410 to a particular LLC slice (i.e., a particular cache 414) based on request address. Any number of cache configurations and cache sizes are contemplated. Depending on the architecture, the cache may be a single internal cache located on an integrated circuit or may be multiple levels of internal caches on the integrated circuit. Other examples include a combination of both internal and external caches depending on particular examples.

During operation, a core 402A, 402B . . . or 402N may send a memory request (read request or write request), via the L1 caches, to the L2 cache (and/or other mid-level cache positioned before the LLC). In one case, a memory controller 430 may intercept a read request from an L1 cache. If the read request hits the L2 cache, the L2 cache returns the data in the cache line that matches a tag lookup. If the read request misses the L2 cache, then the read request is forwarded to the LLC (or the next mid-level cache and eventually to the LLC if the read request misses the mid-level cache(s)). If the read request misses in the LLC, the data is retrieved from system memory 434. In another case, the cache agent 412 may intercept a write request from an L1 cache. If the write request hits the L2 cache after a tag lookup, then the cache agent 412 may perform an in-place write of the data in the cache line. If there is a miss, the cache agent 412 may create a read request to the LLC to bring in the data to the L2 cache. If there is a miss in the LLC, the data is retrieved from system memory 434. Various examples contemplate any number of caches and any suitable caching implementations.

A cache agent 412 may be associated with one or more processing elements (e.g., cores 402) and may process memory requests from these processing elements. In various examples, a cache agent 412 may also manage coherency between all of its associated processing elements. For example, a cache agent 412 may initiate transactions into coherent memory and may retain copies of data in its own cache structure. A cache agent 412 may also provide copies of coherent memory contents to other cache agents.

In various examples, a cache agent 412 may receive a memory request and route the request towards an entity that facilitates performance of the request. For example, if cache agent 412 of a processor receives a memory request specifying a memory address of a memory device (e.g., system memory 434) coupled to the processor, the cache agent 412 may route the request to a memory controller 430 that manages the particular memory device (e.g., in response to a determination that the data is not cached at processor 400. As another example, if the memory request specifies a memory address of a memory device that is on a different processor (but on the same computing node), the cache agent 412 may route the request to an inter-processor communication controller (e.g., controller 604 of FIG. 6) which communicates with the other processors of the node. As yet another example, if the memory request specifies a memory address of a memory device that is located on a different computing node, the cache agent 412 may route the request to a fabric controller (which communicates with other computing nodes via a network fabric such as an Ethernet fabric, an Intel Omni-Path Fabric, an Intel True Scale Fabric, an InfiniBand-based fabric (e.g., Infiniband Enhanced Data Rate fabric), a RapidIO fabric, or other suitable board-to-board or chassis-to-chassis interconnect).

In particular examples, the cache agent 412 may include a system address decoder that maps virtual memory addresses and/or physical memory addresses to entities associated with the memory addresses. For example, for a particular memory address (or region of addresses), the system address decoder may include an indication of the entity (e.g., memory device) that stores data at the particular address or an intermediate entity on the path to the entity that stores the data (e.g., a computing node, a processor, a memory controller, an inter-processor communication controller, a fabric controller, or other entity). When a cache agent 412 processes a memory request, it may consult the system address decoder to determine where to send the memory request.

In particular examples, a cache agent 412 may be a combined caching agent and home agent, referred to herein in as a caching home agent (CHA). A caching agent may include a cache pipeline and/or other logic that is associated with a corresponding portion of a cache memory, such as a distributed portion (e.g., 414) of a last level cache. Each individual cache agent 412 may interact with a corresponding LLC slice (e.g., cache 414). For example, cache agent 412A interacts with cache 414A, cache agent 412B interacts with cache 414B, and so on. A home agent may include a home agent pipeline and may be configured to protect a given portion of a memory such as a system memory 434 coupled to the processor. To enable communications with such memory, CHAs may be coupled to memory controller 430.

In general, a CHA may serve (via a caching agent) as the local coherence and cache controller and also serve (via a home agent) as a global coherence and memory controller interface. In an example, the CHAs may be part of a distributed design, wherein each of a plurality of distributed CHAs are each associated with one of the cores 402. Although in particular examples a cache agent 412 may comprise a cache controller and a home agent, in other examples, a cache agent 412 may comprise a cache controller but not a home agent.

Various examples of the present disclosure may provide hierarchical core valid tracking (HCVT) technology for a cache agent 412 that allows the cache agent 412 to hierarchically track respective associations of the information stored in a cache 414 with the cores 402, where a lowest hierarchical level of the hierarchically tracked associations is to indicate a logical core identifier of a particular core of the cores 402. In some examples, the cache agent 412 may be configured to map one or more upper levels of the hierarchically tracked associations with a software-visible organization of the cores 402. The hierarchically tracked associations may be independent of a physical topology of the cores 402. In some examples, the hierarchically tracked associations may be further provided to one or more snoop filters.

In some examples, the cache agent 412 may be further configured to maintain a hierarchical data structure to store a tracked association between a line of the cache and the cores 402, where the lowest level of the hierarchical data structure may include a bit vector to indicate one or more logical core identifiers that are associated with the line of the cache 414. For example, the hierarchical data structure may include a field (e.g., a sub-group field) to indicate one or more sub-groups of the two or more cores 120, and the hierarchical data structure may represent logical core identifiers in the bit vector for a first sub-group in a reverse order as compared to a second sub-group based on a value of the sub-group field. In another example, the hierarchical data structure may include a first field (e.g., a cluster field) to indicate one or more clusters associated with the line of the cache 414 and a second field (e.g., a sub-cluster field) to indicate, in aggregate, subdivisions of the one or more clusters that have cores associated with the line of the cache 414.

The bandwidth provided by a coherent fabric interconnect 410 (which may provide an external interface to a storage medium to store the captured trace) may allow lossless monitoring of the events associated with the caching agents 412. In various examples, the events at each cache agent 412 of a plurality of cache agents of a processor may be tracked. Accordingly, the HCVT technology may successfully track core ownership information in the hierarchical data structure without requiring the processor 400 to be globally deterministic.

I/O controller 424 may include logic for communicating data between processor 400 and I/O devices 426, which may refer to any suitable devices capable of transferring data to and/or receiving data from an electronic system, such as processor 400. For example, an I/O device may be a network fabric controller; an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input device such as a monitor, printer, mouse, keyboard, or scanner; or other suitable device.

An I/O device 426 may communicate with I/O controller 424 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In various examples, I/O devices 426 coupled to the I/O controller 424 may be located off-chip (i.e., not on the same integrated circuit or die as a processor) or may be integrated on the same integrated circuit or die as a processor.

Memory controller 430 is an integrated memory controller (i.e., it is integrated on the same die or integrated circuit as one or more cores 402 of the processor 400) that includes logic to control the flow of data going to and from system memory 434. Memory controller 430 may include logic operable to read from a system memory 434, write to a system memory 434, or to request other operations from a system memory 434. In various examples, memory controller 430 may receive write requests originating from cores 402 or I/O controller 424 and may provide data specified in these requests to a system memory 434 for storage therein. Memory controller 430 may also read data from system memory 434 and provide the read data to I/O controller 424 or a core 402. During operation, memory controller 430 may issue commands including one or more addresses (e.g., row and/or column addresses) of the system memory 434 in order to read data from or write data to memory (or to perform other operations). In some examples, memory controller 430 may be implemented in a different die or integrated circuit than that of cores 402.

Although not depicted, a computing system including processor 400 may use a battery, renewable energy converter (e.g., solar power or motion-based energy), and/or power supply outlet connector and associated system to receive power, a display to output data provided by processor 400, or a network interface allowing the processor 400 to communicate over a network. In various examples, the battery, power supply outlet connector, display, and/or network interface may be communicatively coupled to processor 400.

Figure 5:
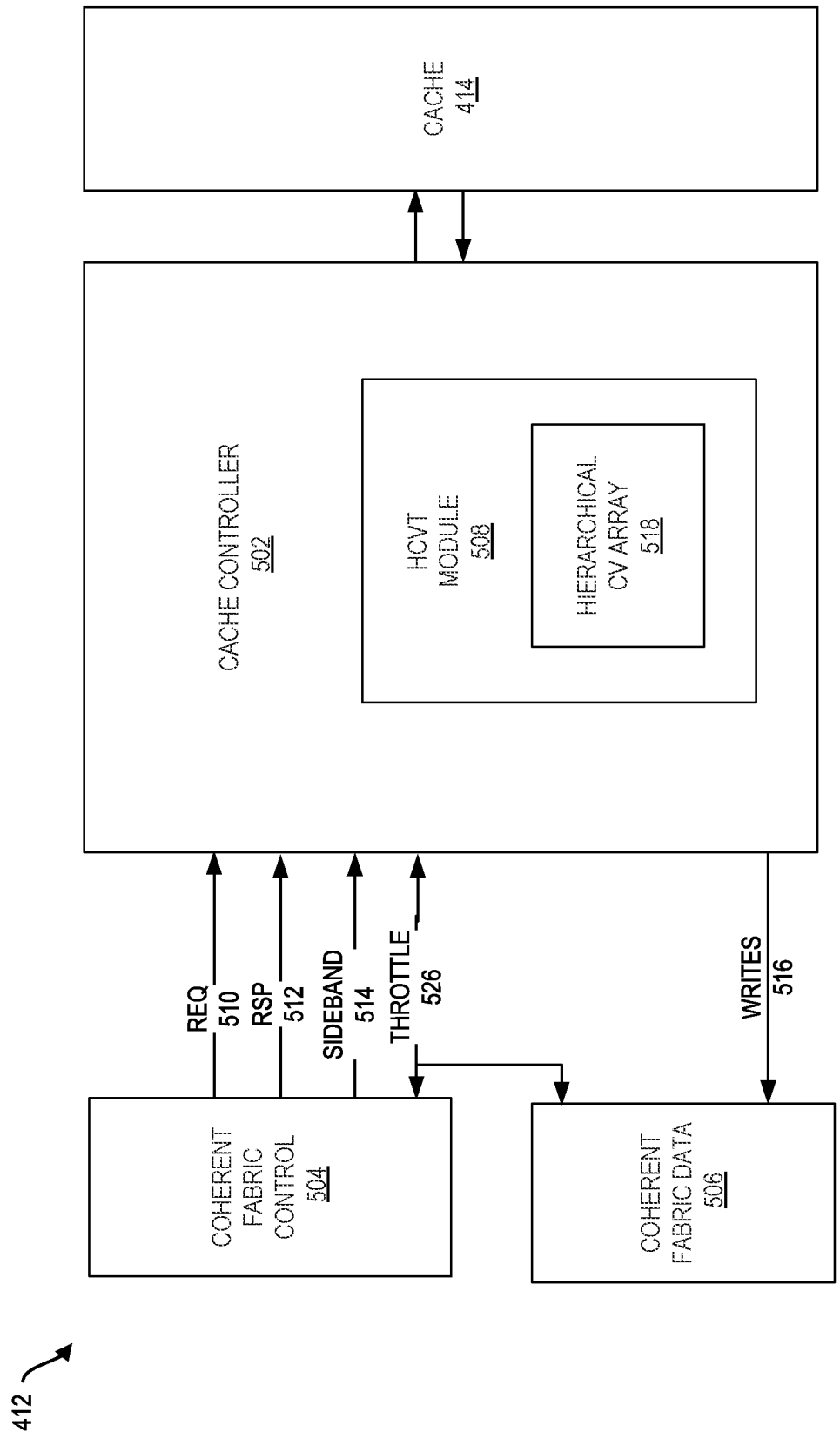
FIG. 5 is a block diagram of an example of a cache agent that includes HCVT technology in one implementation.

FIG. 5 is a block diagram of a cache agent 412 comprising a HCVT module 508 in accordance with certain examples. The HCVT module 508 may include one or more aspects of any of the examples described herein. The HCVT module 508 may be implemented using any suitable logic. In a particular example, the HCVT module 508 may be implemented through firmware executed by a processing element of cache agent 412. In this example, the HCVT module 508 maintains a hierarchical CV array 518, where a lowest level of the hierarchical CV array 518 indicates logical core identifiers (e.g., or relative logical core identifiers).

The HCVT module 508 tracks all relevant inbound messages and updates the hierarchical CV array 518 as needed. For example, an inbound message may indicate a logical ID of a core and the HCVT module 508 may update the lowest level of the hierarchical CV array 518 based on the indicated logical ID of the core.

In a particular example, a separate instance of a HCVT module 508 may be included within each cache agent 412 for each cache controller 502 of a processor 400. In another example, a HCVT module 508 may be coupled to multiple cache agents 412 and hierarchically track CV information for each of the cache agents. The processor 400 may include a coherent fabric interconnect 410 (e.g., a ring or mesh interconnect) that connects the cache agents 412 to each other and to other agents which are able to support a relatively large amount of bandwidth (some of which is to be used to communicate traced information to a storage medium), such as at least one I/O controller (e.g., a PCIe controller) and at least one memory controller.

The coherent fabric control interface 504 (which may include any suitable number of interfaces) includes request interfaces 510, response interfaces 512, and sideband interfaces 514. Each of these interfaces is coupled to cache controller 502. The cache controller 502 may issue writes 516 to coherent fabric data 506.

A throttle signal 526 is sent from the cache controller 502 to flow control logic of the fabric interconnect 410 (and/or components coupled to the fabric interconnect 410) when bandwidth becomes constrained (e.g., when the amount of bandwidth available on the fabric is not enough to handle all the writes 516). In a particular example, the throttle signal 526 may go to a mesh stop or ring stop which includes a flow control mechanism that allows acceptance or rejection of requests from other agents coupled to the interconnect fabric. In various examples, the throttle signal 526 may be the same throttle signal that is used to throttle normal traffic to the cache agent 412 when a receive buffer of the cache agent 412 is full. In a particular example, the sideband interfaces 514 (which may carry any suitable messages such as credits used for communication) are not throttled, but sufficient buffering is provided in the cache controller 502 to ensure that events received on the sideband interface(s) are not lost.

Figure 6:
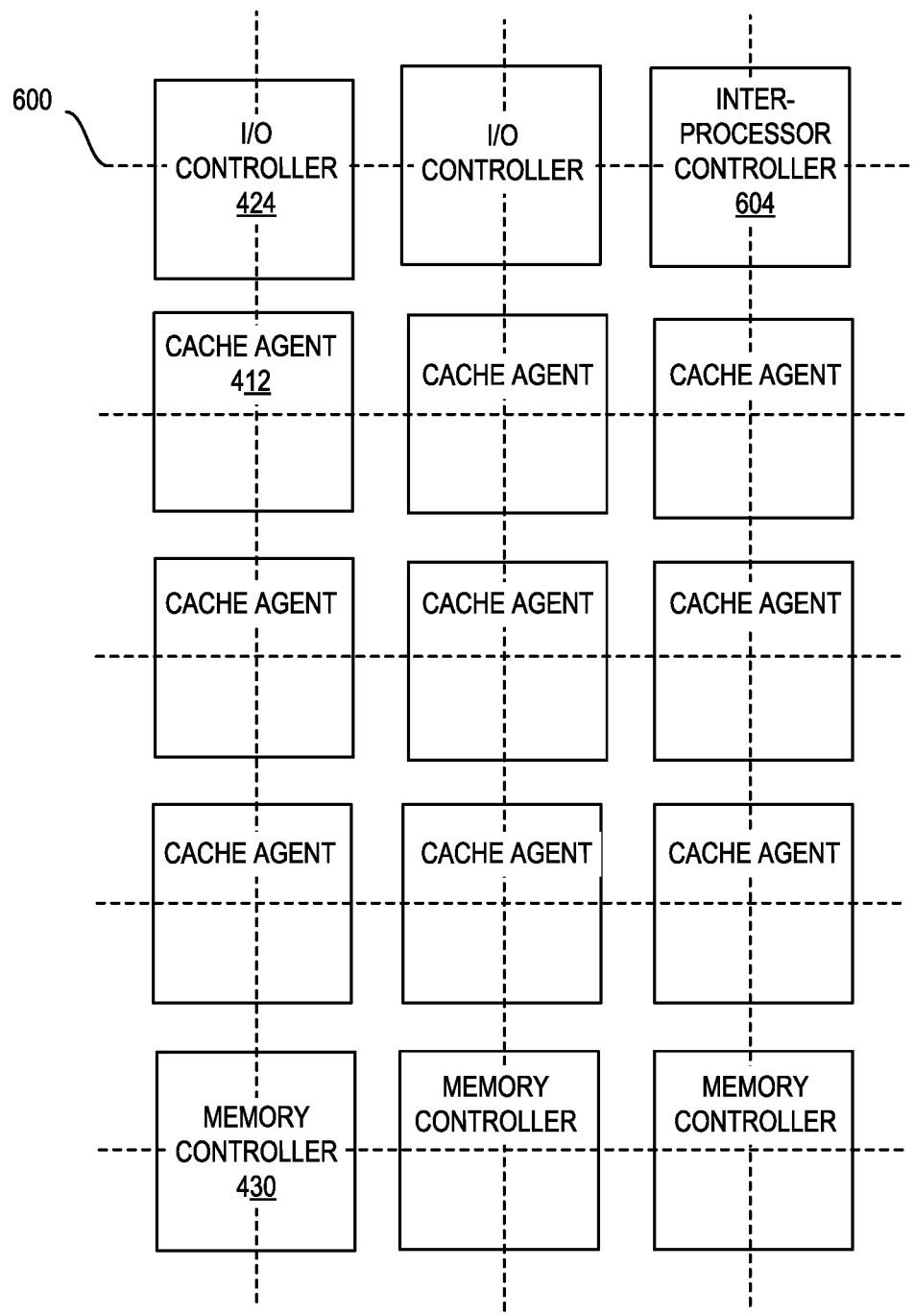
FIG. 6 is an illustrative diagram of an example of a mesh network comprising cache agents that include HCVT technology in one implementation.

FIG. 6 is an example mesh network 600 comprising cache agents 412 in accordance with certain examples. The mesh network 600 is one example of a fabric interconnect 410 that may be used with various examples of the present disclosure. The mesh network 600 may be used to carry requests between the various components (e.g., I/O controllers 424, cache agents 412, memory controllers 430, and inter-processor controller 604).

Inter-processor communication controller 604 provides an interface for inter-processor communication. Inter-processor communication controller 604 may couple to an interconnect that provides a transportation path between two or more processors. In various examples, the interconnect may be a point-to-point processor interconnect, and the protocol used to communicate over the interconnect may have any suitable characteristics of Intel Ultra Path Interconnect (UPI), Intel QuickPath Interconnect (QPI), or other known or future inter-processor communication protocol. In various examples, inter-processor communication controller 604 may be a UPI agent, QPI agent, or similar agent capable of managing inter-processor communications.

Figure 7:
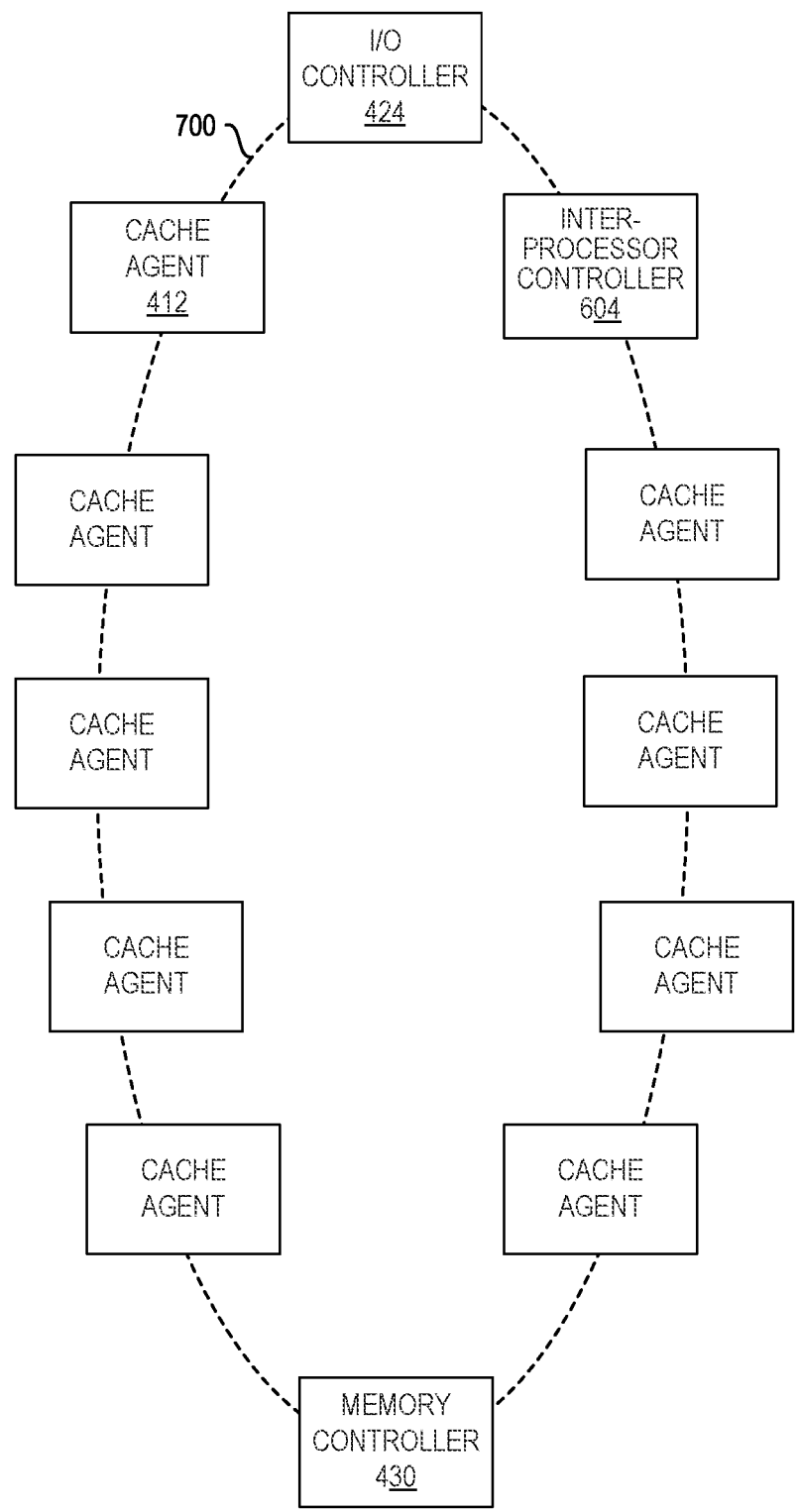
FIG. 7 is an illustrative diagram of an example of a ring network comprising cache agents that include HCVT technology in one implementation.

FIG. 7 is an example ring network comprising cache agents 412 in accordance with certain examples. The ring network 700 is one example of an interconnect fabric 410 that may be used with various examples of the present disclosure. The ring network 700 may be used to carry requests between the various components (e.g., I/O controllers 424, cache agents 412, memory controllers 430, and inter-processor controller 604).

Figure 8:
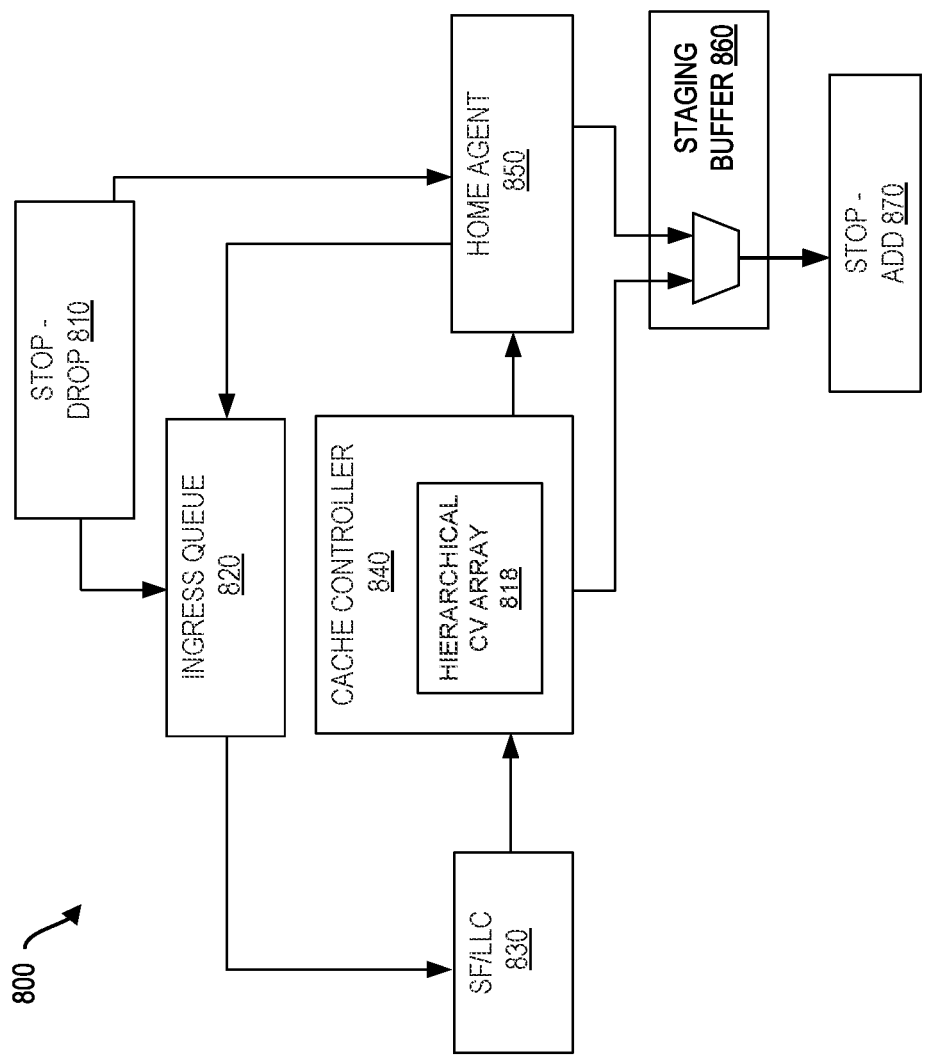
FIG. 8 is a block diagram of an example of a cache home agent that includes HCVT technology in one implementation.

FIG. 8 is a block diagram of another example of a cache agent 800 comprising a HCVT technology in accordance with certain examples. In the example depicted, cache agent 800 is a CHA 800, which may be one of many distributed CHAs that collectively form a coherent combined caching home agent for processor 400 (e.g., as the cache agent 412). In general, the CHA includes various components that couple between interconnect interfaces. Specifically, a first interconnect stop 810 provides inputs from the interconnect fabric 410 to CHA 800 while a second interconnect stop 870 provides outputs from the CHA to interconnect fabric 410. In an example, a processor may include an interconnect fabric such as a mesh interconnect or a ring interconnect such that stops 810 and 870 are configured as mesh stops or ring stops to respectively receive incoming information and to output outgoing information.

As illustrated, first interconnect stop 810 is coupled to an ingress queue 820 that may include one or more entries to receive incoming requests and pass them along to appropriate portions of the CHA. In the implementation shown, ingress queue 820 is coupled to a portion of a cache memory hierarchy, specifically a snoop filter (SF) cache and a LLC (SF/LLC) 830 (which may be a particular example of cache 414). In general, a snoop filter cache of the SF/LLC 830 may be a distributed portion of a directory that includes a plurality of entries that store tag information used to determine whether incoming requests hit in a given portion of a cache. In an example, the snoop filter cache includes entries for a corresponding L2 cache memory to maintain state information associated with the cache lines of the L2 cache. However, the actual data stored in this L2 cache is not present in the snoop filter cache, as the snoop filter cache is rather configured to store the state information associated with the cache lines. In turn, LLC portion of the SF/LLC 830 may be a slice or other portion of a distributed last level cache and may include a plurality of entries to store tag information, cache coherency information, and data as a set of cache lines. In some examples, the snoop filter cache may be implemented at least in part via a set of entries of the LLC including tag information.

Cache controller 840 may include various logic to perform cache processing operations. In general, cache controller 840 may be configured as a pipelined logic (also referred to herein as a cache pipeline) that further includes HCVT technology implemented as a hierarchical CV array 818, that may include various entries to store incoming requests to be processed. The cache controller 840 may perform various processing on memory requests, including various preparatory actions that proceed through a pipelined logic of the caching agent to determine appropriate cache coherency operations. SF/LLC 830 couples to cache controller 840. Response information may be communicated via this coupling based on whether a lookup request (received from ingress queue 820) hits (or not) in the snoop filter/LLC 830. In general, cache controller 840 is responsible for local coherency and interfacing with the SF/LLC 830, and may include one or more trackers each having a plurality of entries to store pending requests.

As further shown, cache controller 840 also couples to a home agent 850 which may include a pipelined logic (also referred to herein as a home agent pipeline) and other structures used to interface with and protect a corresponding portion of a system memory. In general, home agent 850 may include one or more trackers each having a plurality of entries to store pending requests and to enable these requests to be processed through a memory hierarchy. For read requests that miss the snoop filter/LLC 830, home agent 850 registers the request in a tracker, determines if snoops are to be spawned, and/or memory reads are to be issued based on a number of conditions. In an example, the cache memory pipeline is roughly 9 clock cycles, and the home agent pipeline is roughly 4 clock cycles. This allows the CHA 800 to produce a minimal memory/cache miss latency using an integrated home agent.

Outgoing requests from cache controller 840 and home agent 850 couple through a staging buffer 860 to interconnect stop 870. In an example, staging buffer 860 may include selection logic to select between requests from the two pipeline paths. In an example, cache controller 840 generally may issue remote requests/responses, while home agent 850 may issue memory read/writes and snoops/forwards.

With the arrangement shown in FIG. 8, first interconnect stop 810 may provide incoming snoop responses or memory responses (e.g., received from off-chip) to home agent 850. Via coupling between home agent 850 and ingress queue 820, home agent completions may be provided to the ingress queue. In addition, to provide for optimized handling of certain memory transactions as described herein (updates such as updates to snoop filter entries), home agent 850 may further be coupled to cache controller 840 via a bypass path, such that information for certain optimized flows can be provided to a point deep in the cache pipeline of cache controller 840. Note also that cache controller 840 may provide information regarding local misses directly to home agent 850. While a particular cache agent architecture is shown in FIG. 8, any suitable cache agent architectures are contemplated in various examples of the present disclosure.

The figures below detail exemplary architectures and systems to implement examples of the above. In some examples, one or more hardware components and/or instructions described above are emulated as detailed below, or implemented as software modules.

Processor cores may be implemented in different ways, for different purposes, and in different processors. For instance, implementations of such cores may include: 4) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 4) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 4) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a SoC that may include on the same die the described CPU (sometimes referred to as the application core(s) or application processor(s)), the above described coprocessor, and additional functionality. Exemplary core architectures are described next, followed by descriptions of exemplary processors and computer architectures.

Figure 9:
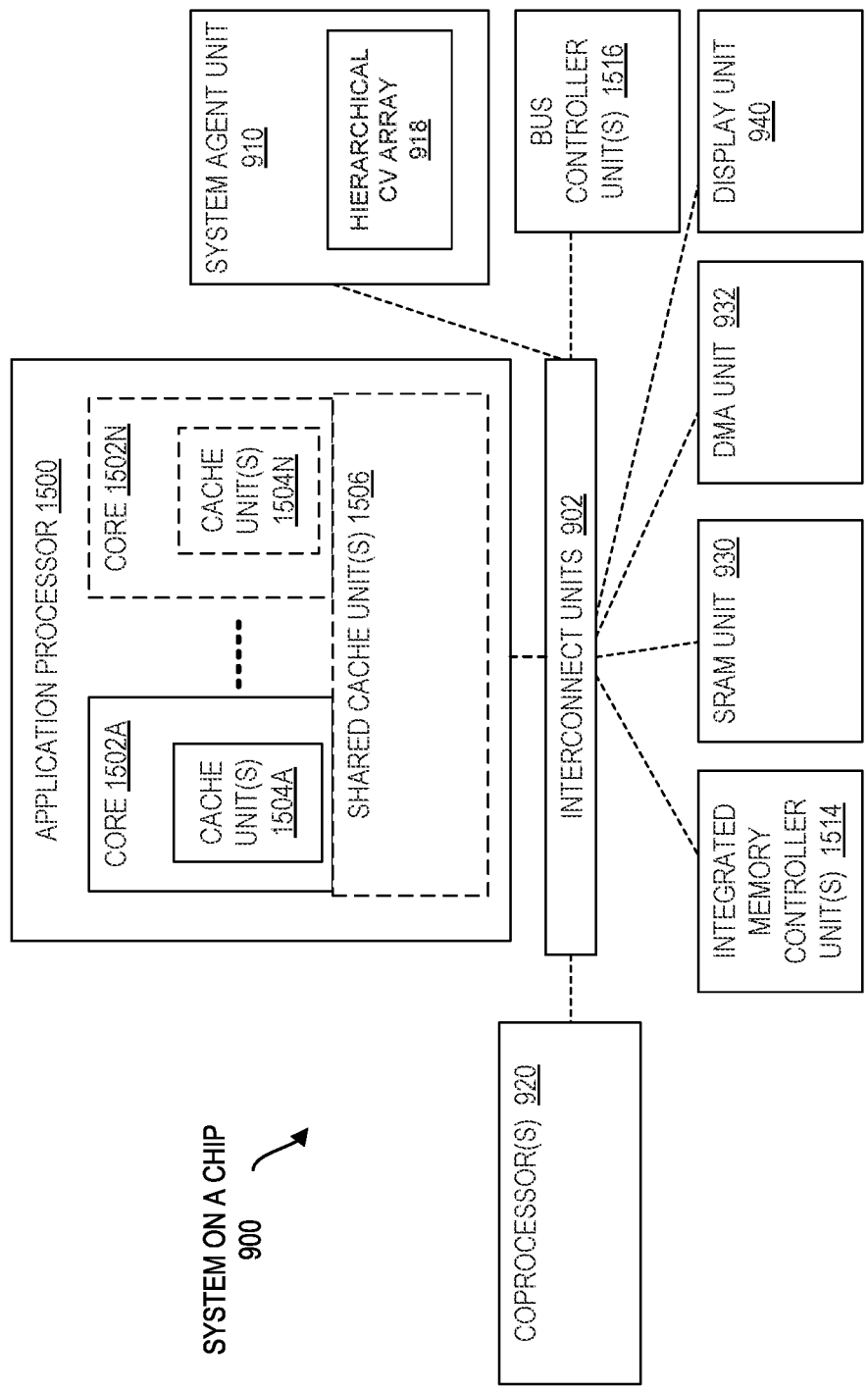
FIG. 9 is a block diagram of an example of a system on a chip in one implementation.

FIG. 9 depicts a block diagram of a SoC 900 in accordance with an example of the present disclosure. Similar elements in FIG. 15 bear similar reference numerals. Also, dashed lined boxes are optional features on more advanced SoCs. In FIG. 9, an interconnect unit(s) 902 is coupled to: an application processor 1500 which includes a set of one or more cores 1502A-N with cache unit(s) 1504A-N and shared cache unit(s) 1506; a bus controller unit(s) 1516; an integrated memory controller unit(s) 1514; a set or one or more coprocessors 920 which may include integrated graphics logic, an image processor, an audio processor, and a video processor; an static random-access memory (SRAM) unit 930; a direct memory access (DMA) unit 932; a display unit 940 for coupling to one or more external displays; and a system agent unit 910 that includes HCVT technology as described herein to maintain a hierarchical CV array 918. In one example, the coprocessor(s) 920 include a special-purpose processor, such as, for example, a network or communication processor, compression and/or decompression engine, GPGPU, a high-throughput MIC processor, embedded processor, or the like.

Figure 10:
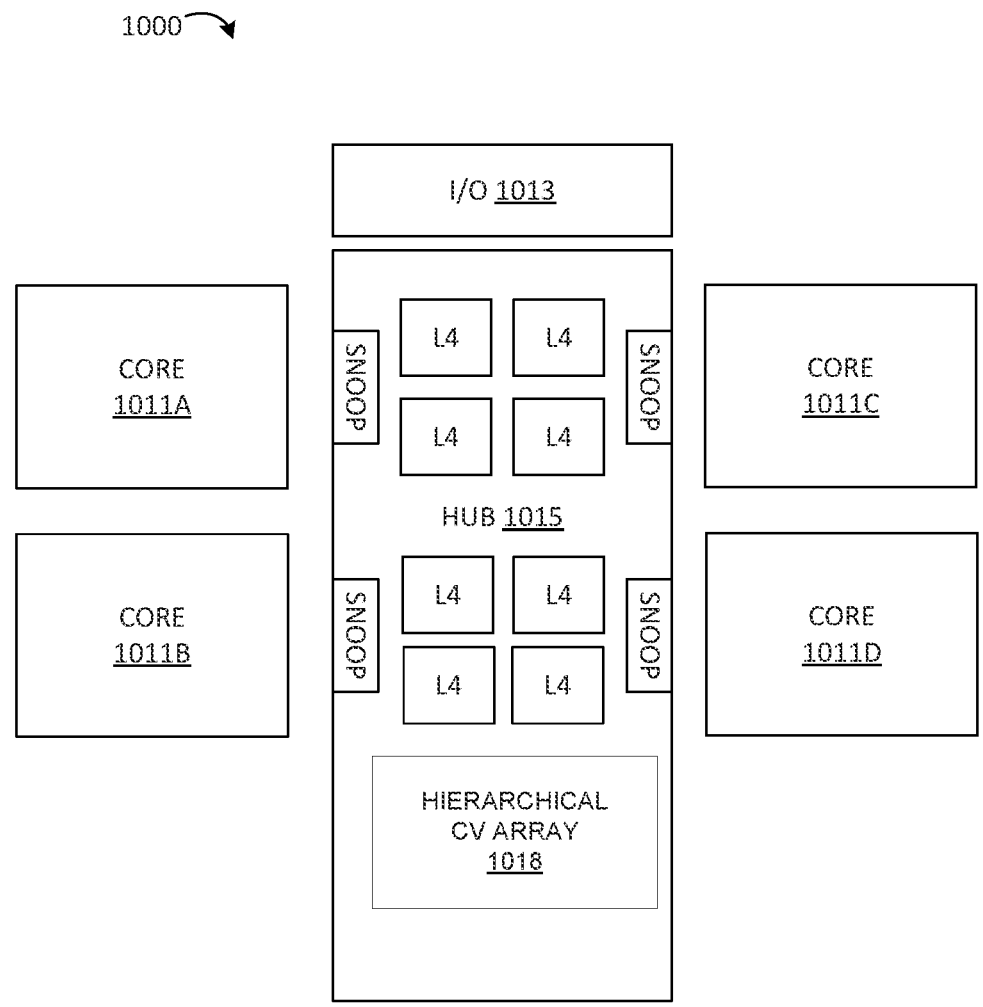
FIG. 10 is a block diagram of an example of a system in one implementation.

With reference to FIG. 10, an example of a system 1000 includes various caches that may utilize examples of the HCVT technology described herein. In some examples, a last-level cache (LLC) may utilize HCVT technology. In some examples, as shown in FIG. 10, a level four (L4) cache may utilize HCVT technology. For example, the system 1000 includes multiple processor cores 1011A-D and an I/O interface 1013 (e.g., a compute express link (CXL) interface coupled to a hub 1015 (e.g., a platform controller hub (PCH)). The hub 1015 includes L4 cache and snoop filters (e.g., ULTRA PATH INTERCONNECT (UPI) snoop filters). One or more of the I/O interface 1013, the snoop filters, and the hub 1015 may be configured to utilize examples of the HCVT technology described herein. As illustrated, the hub 1015 is configured to maintain a hierarchical CV array 1018.

Figure 11:
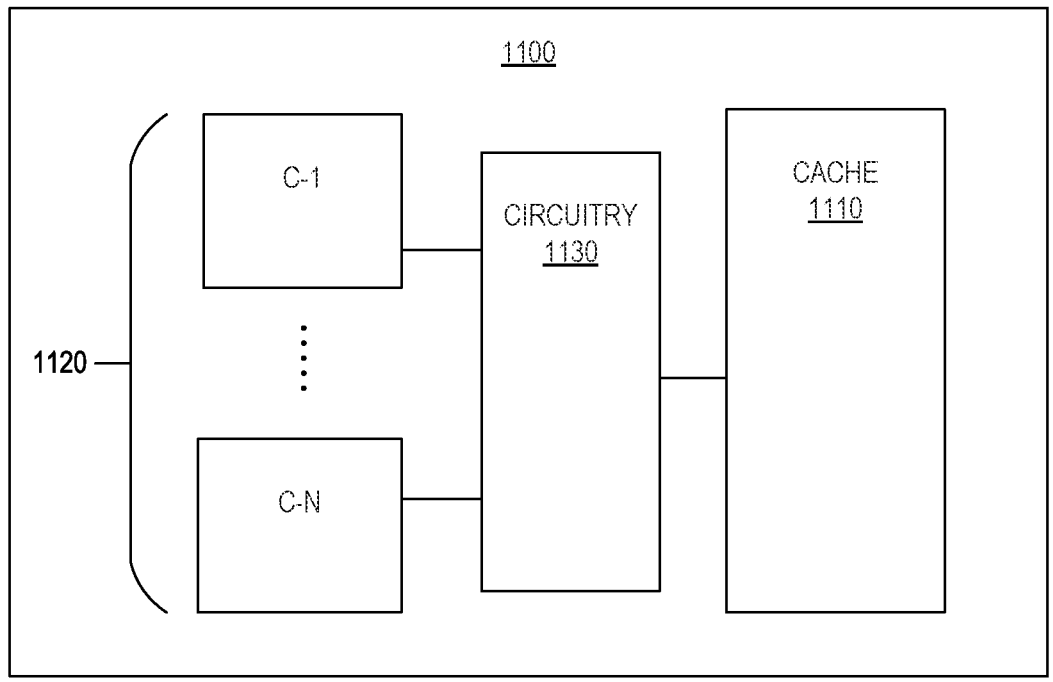
FIG. 11 is a block diagram of an example of an apparatus that includes HCVT technology in one implementation.

FIG. 11 shows an example of an apparatus 1100 comprising a cache 1110 to store information accessible by two or more cores 1120 (e.g., core C-1 through core C-N, where N>1), and circuitry 1130 coupled to the cache 1110 to maintain coherence of the information stored in the cache 1110 and to hierarchically track respective associations of the information stored in the cache with the two or more cores 1120, where a lowest hierarchical level of the hierarchically tracked associations is to indicate a logical core identifier of a particular core of the two or more cores 1120. In some examples, the circuitry 1130 may be configured to map one or more upper levels of the hierarchically tracked associations with a software-visible organization of the two or more cores 1120, and/or the hierarchically tracked associations may be independent of a physical topology of the two or more cores 1120. In some examples, the circuitry 1130 may be further configured to provide access to the hierarchically tracked associations to one or more snoop filters.

In some examples, the circuitry 1130 may be further configured to maintain a hierarchical data structure to store a tracked association between a line of the cache 1110 and the two or more cores 1120, where the lowest level of the hierarchical data structure may include a bit vector to indicate one or more logical core identifiers that are associated with the line of the cache 1110. For example, the hierarchical data structure may include a field (e.g., a sub-group field) to indicate one or more sub-groups of the two or more cores 1120, and the hierarchical data structure may represent logical core identifiers in the bit vector for a first sub-group in a reverse order as compared to a second sub-group based on a value of the sub-group field. In another example, the hierarchical data structure may include a first field (e.g., a cluster field) to indicate one or more clusters associated with the line of the cache 1110 and a second field (e.g., a sub-cluster field) to indicate, in aggregate, subdivisions of the one or more clusters that have cores associated with the line of the cache 1110.

Figure 19:
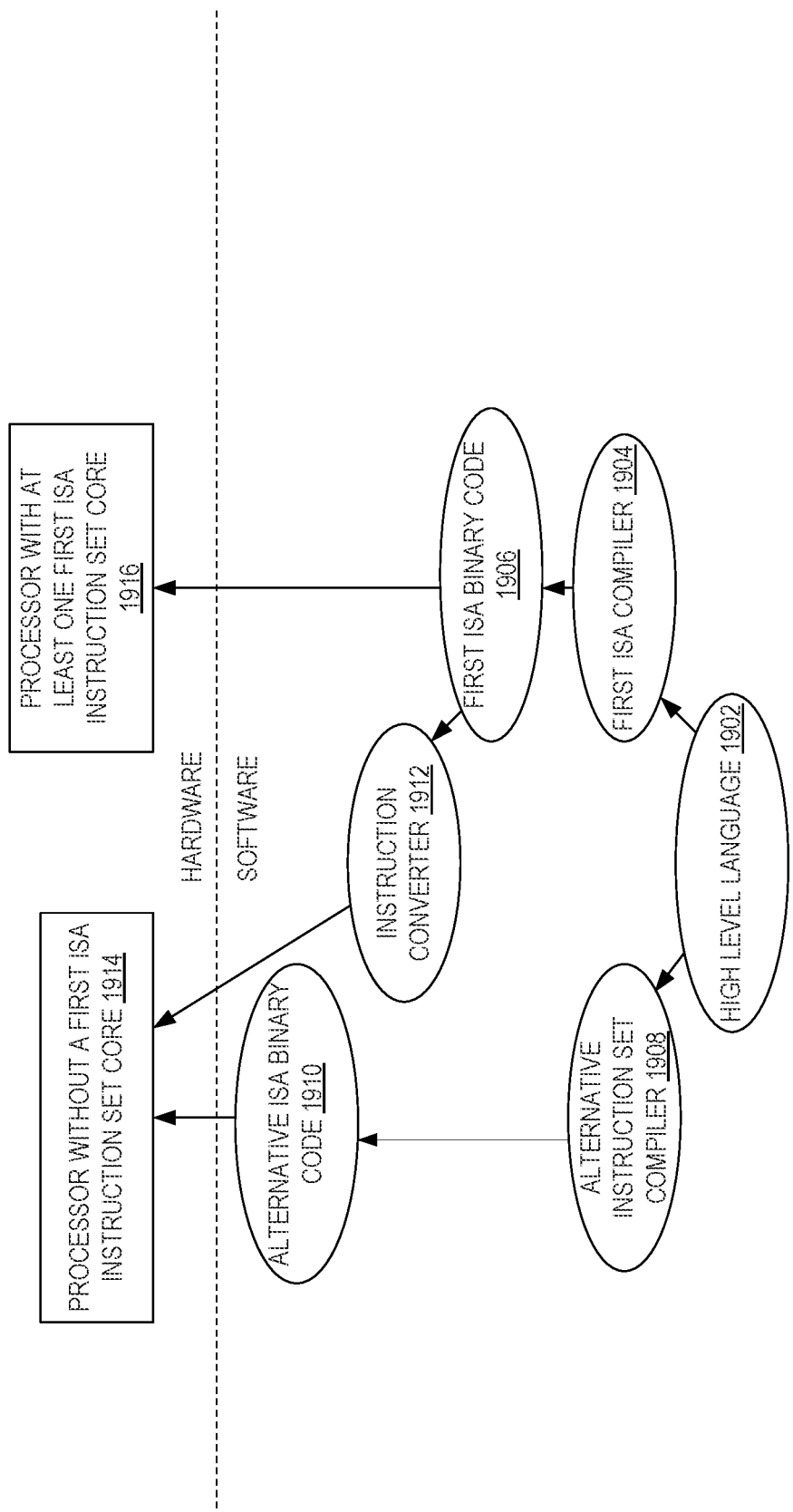
FIG. 19 is a block diagram illustrating the use of a software instruction converter to convert binary instructions in a source instruction set architecture to binary instructions in a target instruction set architecture according to examples.

For example, the circuitry 1130 may be incorporated in any of the processors/systems described herein. In some examples, the circuitry 1130 may be incorporated in the processor 400 (FIG. 4), processor 1400, the processor 1470, the processor 1415, the coprocessor 1438, the processor/coprocessor 1480 (FIG. 14), the processor 1500 (FIG. 15), the core 1690 (FIG. 16B), the execution units 1662 (FIGS. 16B and 17), and the processor 1916 (FIG. 19). In particular, the circuitry 1130 may be integrated as part of uncore components and/or with the cache agent 412 (FIGS. 4 to 7), the cache home agent 800 (FIG. 8), the system agent unit 910 (FIG. 9), the hub 1015 (FIG. 10), and the system agent 1510 (FIG. 15). In some examples, the circuitry 1130 may implement the data structure 100 for a format of an entry of a CV directory or array (FIGS. 1 to 3).

Figure 12A:
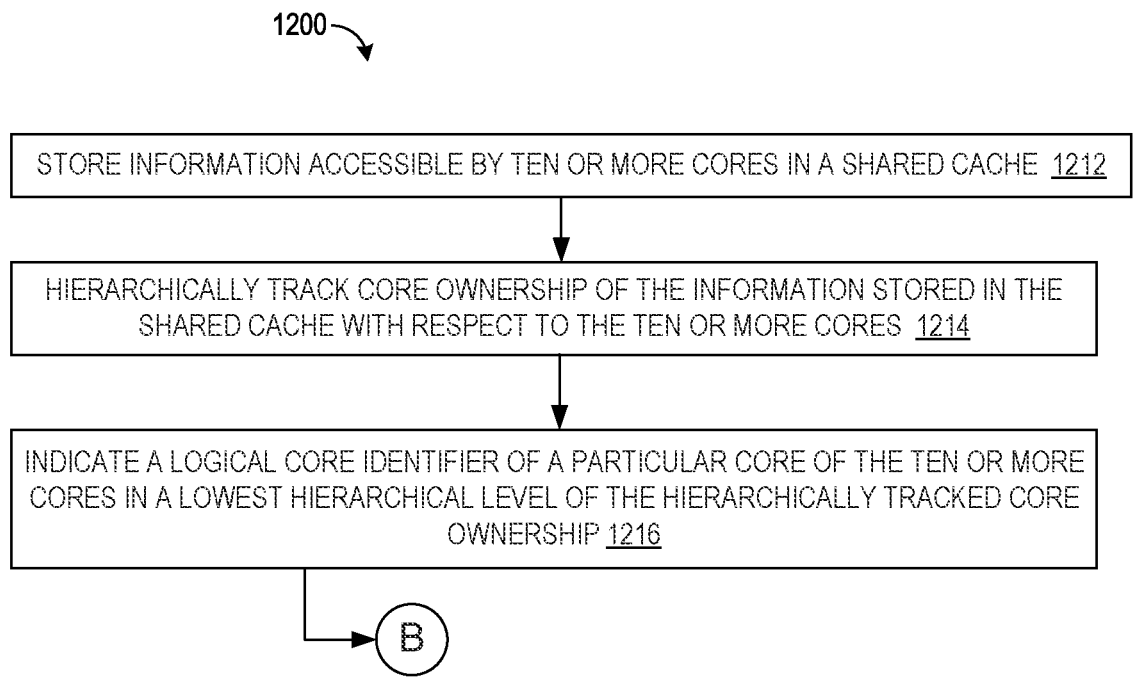
FIGS. 12A to 12B are illustrative diagrams of an example of a method in one implementation.
Figure 12B:
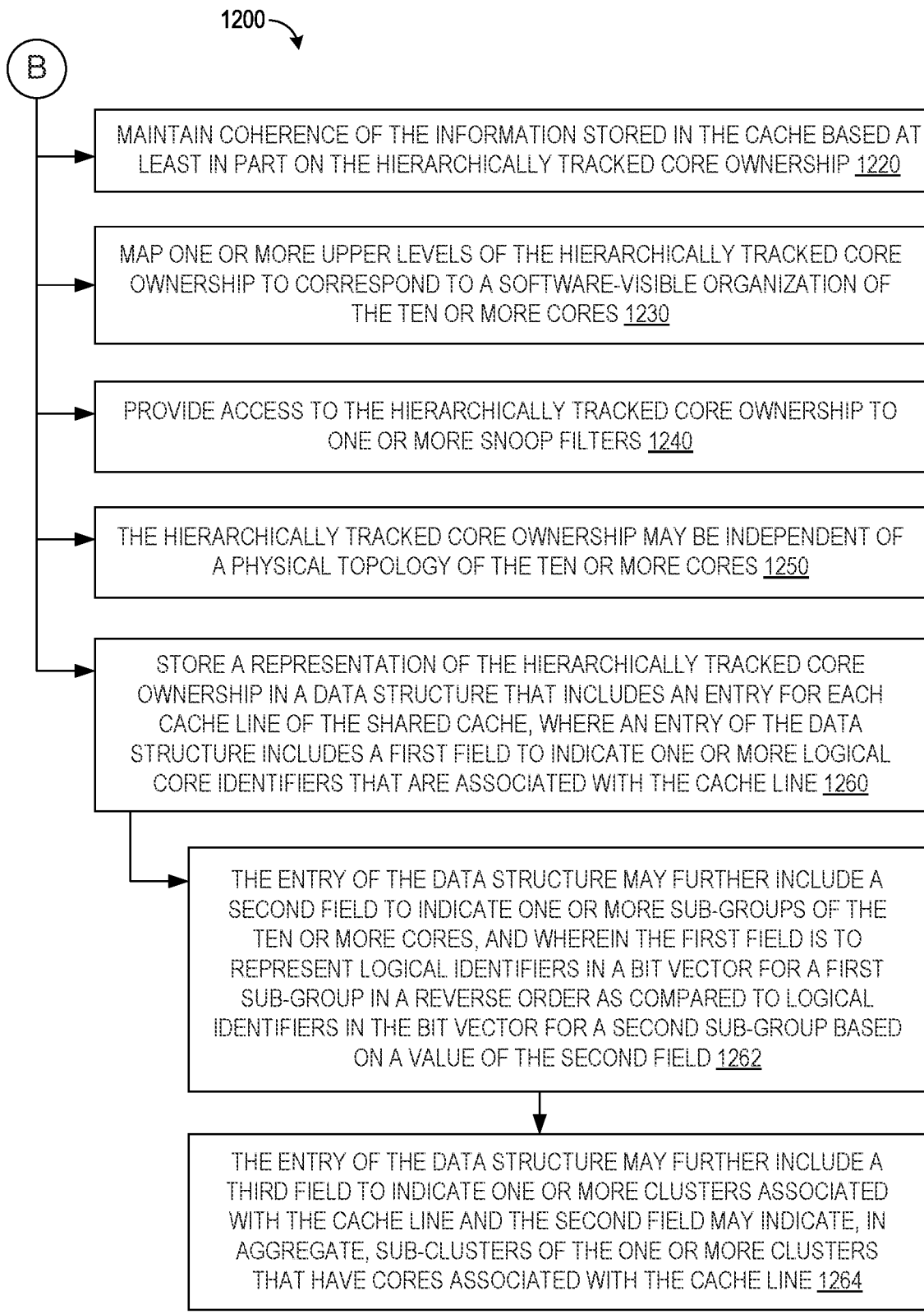

FIGS. 12A to 12B show an example of a method 1200 comprising storing information accessible by ten or more cores in a shared cache at 1212, hierarchically tracking core ownership of the information stored in the shared cache with respect to the ten or more cores at 1214, and indicating a logical core identifier of a particular core of the ten or more cores in a lowest hierarchical level of the hierarchically tracked core ownership at 1216. In some examples, the method 1200 may further include maintaining coherence of the information stored in the cache based at least in part on the hierarchically tracked core ownership at 1220, mapping one or more upper levels of the hierarchically tracked core ownership to correspond to a software-visible organization of the ten or more cores at 1230, and/or providing access to the hierarchically tracked core ownership to one or more snoop filters at 1240. For example, the hierarchically tracked core ownership may be independent of a physical topology of the ten or more cores at 1250.

In some examples, the method 1200 may further include storing a representation of the hierarchically tracked core ownership in a data structure that includes an entry for each cache line of the shared cache, where an entry of the data structure includes a first field to indicate one or more logical core identifiers that are associated with the cache line at 1260. For example, the entry of the data structure may further include a second field to indicate one or more sub-groups of the ten or more cores, and wherein the first field is to represent logical core identifiers in a bit vector for a first sub-group in a reverse order as compared to logical core identifiers in the bit vector for a second sub-group based on a value of the second field at 1262. In another example, the entry of the data structure may further include a third field to indicate one or more clusters associated with the cache line and the second field may indicate, in aggregate, sub-clusters of the one or more clusters that have cores associated with the cache line at 1264.

For example, the method 1200 may be performed by any of the processors/systems described herein. In some examples, method 1200 may be performed by the processor 400 (FIG. 4), processor 1400, the processor 1470, the processor 1415, the coprocessor 1438, the processor/coprocessor 1480 (FIG. 14), the processor 1500 (FIG. 15), the core 1690 (FIG. 16B), the execution units 1662 (FIGS. 16B and 17), and the processor 1916 (FIG. 19). In particular, various aspects of the method 1200 may be performed by uncore components and/or by the cache agent 412 (FIGS. 4 to 7), the cache home agent 800 (FIG. 8), the system agent unit 910 (FIG. 9), the hub 1015 (FIG. 10), and the system agent 1510 (FIG. 15). In some examples, the method 1200 may utilize the data structure 100 for a format of an entry of a CV directory or array (FIGS. 1 to 3).

Figure 13:
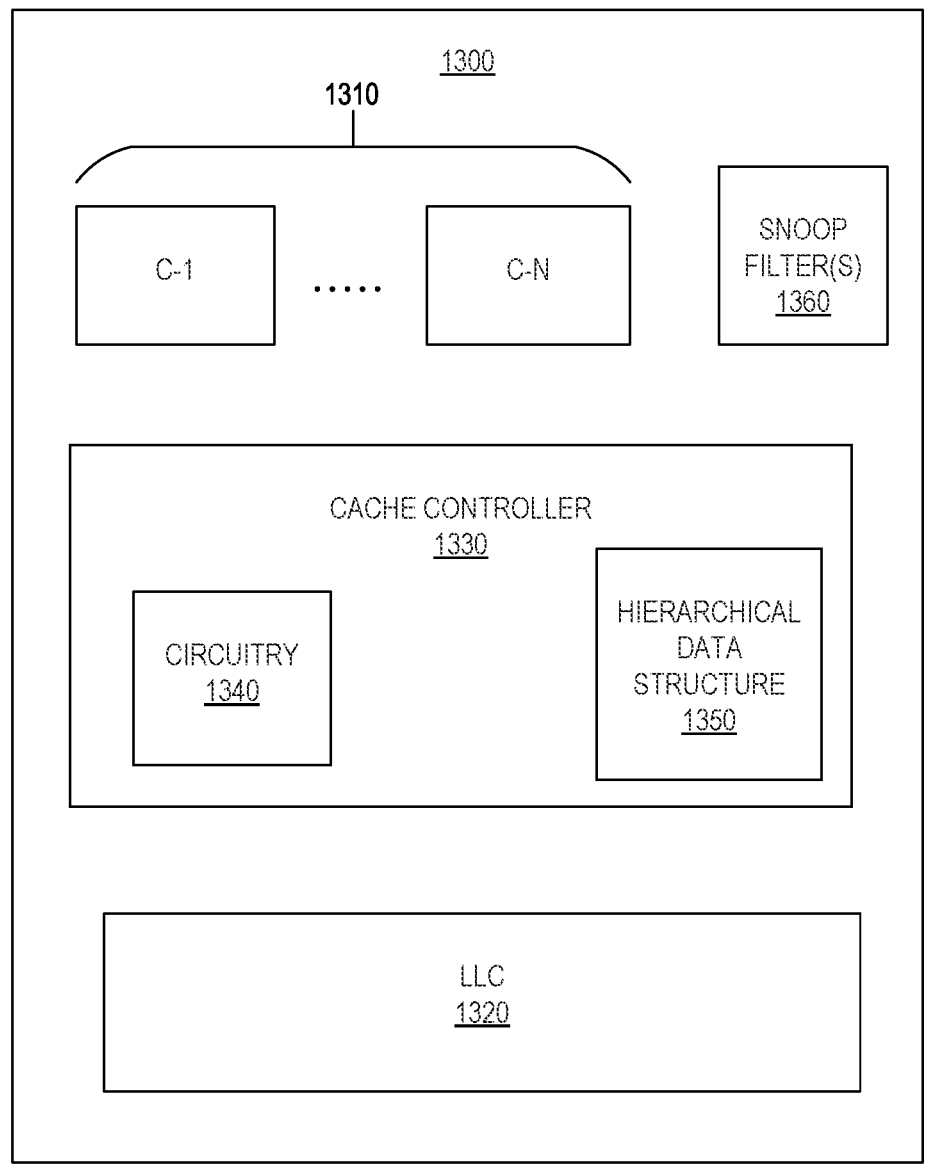
FIG. 13 is a block diagram of another example of an apparatus that includes HCVT technology in one implementation.

FIG. 13 shows an example of an apparatus 1300 comprising ten or more cores 1310 (e.g., core C-1 through C-N, where N>9), a last level cache (LLC) 1320, and a cache controller 1330 coupled to the ten or more cores 1310 and the LLC 1320, wherein the cache controller 1330 includes circuitry 1340 to maintain a hierarchical data structure 1350 to track core ownership of cache lines of the LLC 1320, where a lowest hierarchical level of the hierarchical data structure 1350 may be structured to indicate a logical core identifier of a particular core of the ten or more cores 1310. For example, the circuitry 1340 may also be configured to maintain a coherence of the LLC 1320 based at least in part on the hierarchical data structure 1350. In some examples, the circuitry 1340 may be additionally or alternatively configured to provide one or more snoop filters 1360 access to the hierarchical data structure 1350.

In some examples, the hierarchical data structure 1350 may include an entry for each cache line of the LLC 1320, and an entry of the hierarchical data structure 1350 may include a bit vector to indicate one or more logical core identifiers that are associated with the cache line. In some examples, the entry of the hierarchical data structure 1350 may further include a field to indicate one or more sub-groups of the ten or more cores 1310, and the bit vector may represent logical core identifiers for a first sub-group in a reverse order as compared to a second sub-group based on a value of the field. In another example, the entry of the hierarchical data structure 1350 may further include a first field to indicate one or more clusters associated with the cache line and a second field to indicate, in aggregate, sub-clusters of the one or more clusters that have cores associated with the cache line.

For example, the circuitry 1340 may be incorporated in any of the processors/systems described herein. In some examples, the circuitry 1340 may be incorporated in the processor 400 (FIG. 4), processor 1400, the processor 1470, the processor 1415, the coprocessor 1438, the processor/coprocessor 1480 (FIG. 14), the processor 1500 (FIG. 15), the core 1690 (FIG. 16B), the execution units 1662 (FIGS. 16B and 17), and the processor 1916 (FIG. 19). In particular, the circuitry 1340 may be integrated as part of uncore components and/or with the cache agent 412 (FIGS. 4 to 7), the cache home agent 800 (FIG. 8), the system agent unit 910 (FIG. 9), the hub 1015 (FIG. 10), and the system agent 1510 (FIG. 15). In some examples, the circuitry 1340 may implement the data structure 100 (FIGS. 1 to 3) for a format of an entry of the hierarchical data structure 1350.

Exemplary Computer Architectures.

Detailed below are describes of exemplary computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 14:
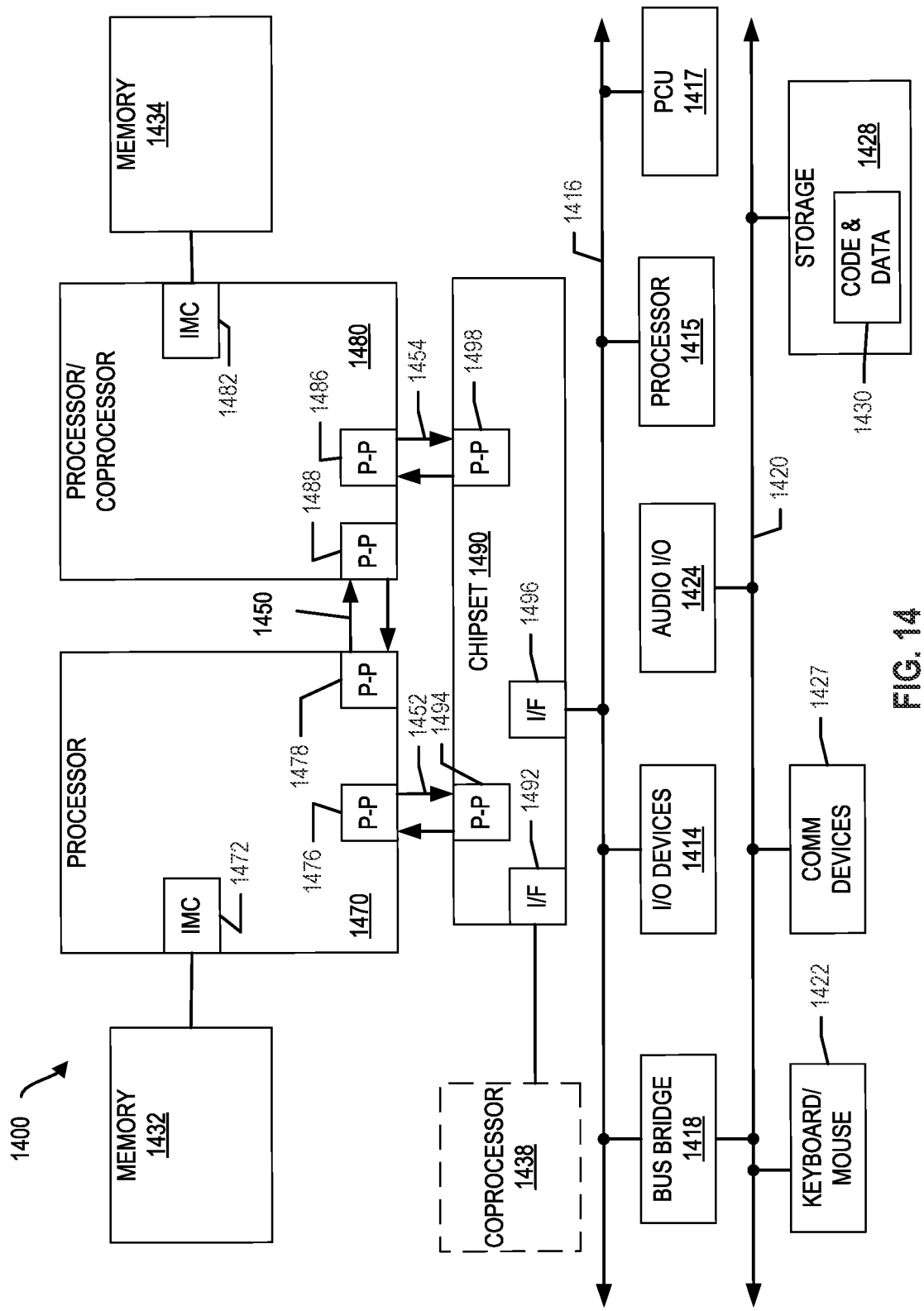
FIG. 14 illustrates an exemplary system.
Figure 15:
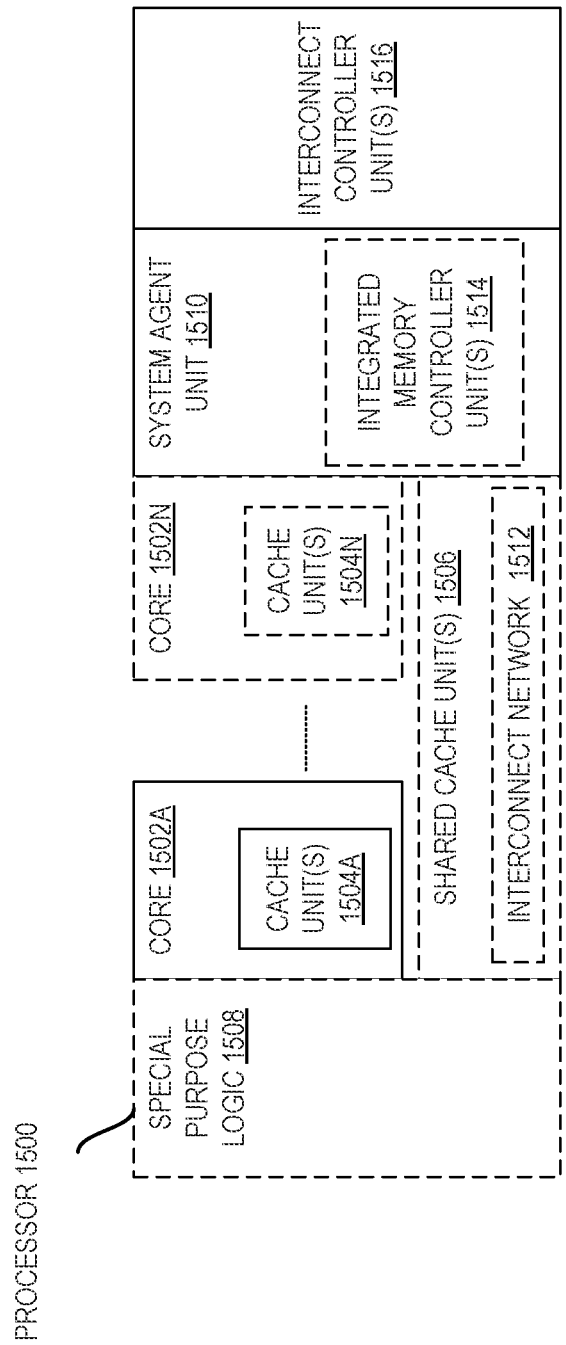
FIG. 15 illustrates a block diagram of an example processor that may have more than one core and an integrated memory controller.

FIG. 14 illustrates an exemplary system. Multiprocessor system 1400 is a point-to-point interconnect system and includes a plurality of processors including a first processor 1470 and a second processor 1480 coupled via a point-to-point interconnect 1450. In some examples, the first processor 1470 and the second processor 1480 are homogeneous. In some examples, first processor 1470 and the second processor 1480 are heterogenous. Though the exemplary system 1400 is shown to have two processors, the system may have three or more processors, or may be a single processor system.

Processors 1470 and 1480 are shown including integrated memory controller (IMC) circuitry 1472 and 1482, respectively. Processor 1470 also includes as part of its interconnect controller point-to-point (P-P) interfaces 1476 and 1478; similarly, second processor 1480 includes P-P interfaces 1486 and 1488. Processors 1470, 1480 may exchange information via the point-to-point (P-P) interconnect 1450 using P-P interface circuits 1478, 1488. IMCs 1472 and 1482 couple the processors 1470, 1480 to respective memories, namely a memory 1432 and a memory 1434, which may be portions of main memory locally attached to the respective processors.

Processors 1470, 1480 may each exchange information with a chipset 1490 via individual P-P interconnects 1452, 1454 using point to point interface circuits 1476, 1494, 1486, 1498. Chipset 1490 may optionally exchange information with a coprocessor 1438 via an interface 1492. In some examples, the coprocessor 1438 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 1470, 1480 or outside of both processors, yet connected with the processors via P-P interconnect, such that either or both processors' local cache information may be stored in the shared cache if a processor is placed into a low power mode.

Chipset 1490 may be coupled to a first interconnect 1416 via an interface 1496. In some examples, first interconnect 1416 may be a Peripheral Component Interconnect (PCI) interconnect, or an interconnect such as a PCI Express interconnect or another I/O interconnect. In some examples, one of the interconnects couples to a power control unit (PCU) 1417, which may include circuitry, software, and/or firmware to perform power management operations with regard to the processors 1470, 1480 and/or co-processor 1438. PCU 1417 provides control information to a voltage regulator (not shown) to cause the voltage regulator to generate the appropriate regulated voltage. PCU 1417 also provides control information to control the operating voltage generated. In various examples, PCU 1417 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 1417 is illustrated as being present as logic separate from the processor 1470 and/or processor 1480. In other cases, PCU 1417 may execute on a given one or more of cores (not shown) of processor 1470 or 1480. In some cases, PCU 1417 may be implemented as a microcontroller (dedicated or general-purpose) or other control logic configured to execute its own dedicated power management code, sometimes referred to as P-code. In yet other examples, power management operations to be performed by PCU 1417 may be implemented externally to a processor, such as by way of a separate power management integrated circuit (PMIC) or another component external to the processor. In yet other examples, power management operations to be performed by PCU 1417 may be implemented within BIOS or other system software.

Various I/O devices 1414 may be coupled to first interconnect 1416, along with a bus bridge 1418 which couples first interconnect 1416 to a second interconnect 1420. In some examples, one or more additional processor(s) 1415, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interconnect 1416. In some examples, second interconnect 1420 may be a low pin count (LPC) interconnect. Various devices may be coupled to second interconnect 1420 including, for example, a keyboard and/or mouse 1422, communication devices 1427 and a storage circuitry 1428. Storage circuitry 1428 may be one or more non-transitory machine-readable storage media as described below, such as a disk drive or other mass storage device which may include instructions/code and data 1430 in some examples. Further, an audio I/O 1424 may be coupled to second interconnect 1420. Note that other architectures than the point-to-point architecture described above are possible. For example, instead of the point-to-point architecture, a system such as multiprocessor system 1400 may implement a multi-drop interconnect or other such architecture.

Exemplary Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a SoC that may include on the same die as the described CPU (sometimes referred to as the application core(s) or application processor(s)), the above described coprocessor, and additional functionality. Exemplary core architectures are described next, followed by descriptions of exemplary processors and computer architectures.

FIG. 15 illustrates a block diagram of an example processor 1500 that may have more than one core and an integrated memory controller. The solid lined boxes illustrate a processor 1500 with a single core 1502A, a system agent unit circuitry 1510, a set of one or more interconnect controller unit(s) circuitry 1516, while the optional addition of the dashed lined boxes illustrates an alternative processor 1500 with multiple cores 1502(A)-(N), a set of one or more integrated memory controller unit(s) circuitry 1514 in the system agent unit circuitry 1510, and special purpose logic 1508, as well as a set of one or more interconnect controller units circuitry 1516. Note that the processor 1500 may be one of the processors 1470 or 1480, or co-processor 1438 or 1415 of FIG. 14.

Thus, different implementations of the processor 1500 may include: 1) a CPU with the special purpose logic 1508 being integrated graphics and/or scientific (throughput) logic (which may include one or more cores, not shown), and the cores 1502(A)-(N) being one or more general purpose cores (e.g., general purpose in-order cores, general purpose out-of-order cores, or a combination of the two); 2) a coprocessor with the cores 1502(A)-(N) being a large number of special purpose cores intended primarily for graphics and/or scientific (throughput); and 3) a coprocessor with the cores 1502(A)-(N) being a large number of general purpose in-order cores. Thus, the processor 1500 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 1504(A)-(N) within the cores 1502(A)-(N), a set of one or more shared cache unit(s) circuitry 1506, and external memory (not shown) coupled to the set of integrated memory controller unit(s) circuitry 1514. The set of one or more shared cache unit(s) circuitry 1506 may include one or more mid-level caches, such as level 2 (L2), level 3 (L3), level 4 (L4), or other levels of cache, such as a last level cache (LLC), and/or combinations thereof. While in some examples ring-based interconnect network circuitry 1512 interconnects the special purpose logic 1508 (e.g., integrated graphics logic), the set of shared cache unit(s) circuitry 1506, and the system agent unit circuitry 1510, alternative examples use any number of well-known techniques for interconnecting such units. In some examples, coherency is maintained between one or more of the shared cache unit(s) circuitry 1506 and cores 1502(A)-(N).

In some examples, one or more of the cores 1502(A)-(N) are capable of multi-threading. The system agent unit circuitry 1510 includes those components coordinating and operating cores 1502(A)-(N). The system agent unit circuitry 1510 may include, for example, power control unit (PCU) circuitry and/or display unit circuitry (not shown). The PCU may be or may include logic and components needed for regulating the power state of the cores 1502(A)-(N) and/or the special purpose logic 1508 (e.g., integrated graphics logic). The display unit circuitry is for driving one or more externally connected displays.

The cores 1502(A)-(N) may be homogenous in terms of instruction set architecture (ISA). Alternatively, the cores 1502(A)-(N) may be heterogeneous in terms of ISA; that is, a subset of the cores 1502(A)-(N) may be capable of executing an ISA, while other cores may be capable of executing only a subset of that ISA or another ISA.

Exemplary Core Architectures—in-Order and Out-of-Order Core Block Diagram.

Figure 16A:
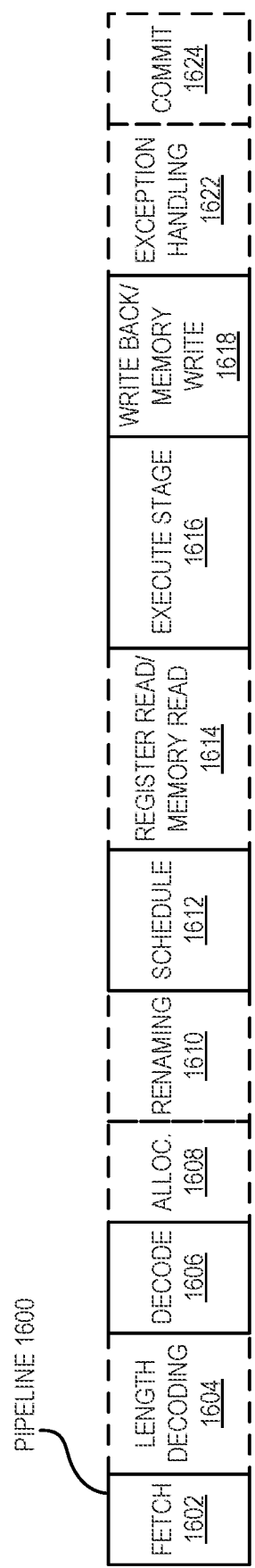
FIG. 16A is a block diagram illustrating both an exemplary in-order pipeline and an exemplary register renaming, out-of-order issue/execution pipeline according to examples.
Figure 16B:
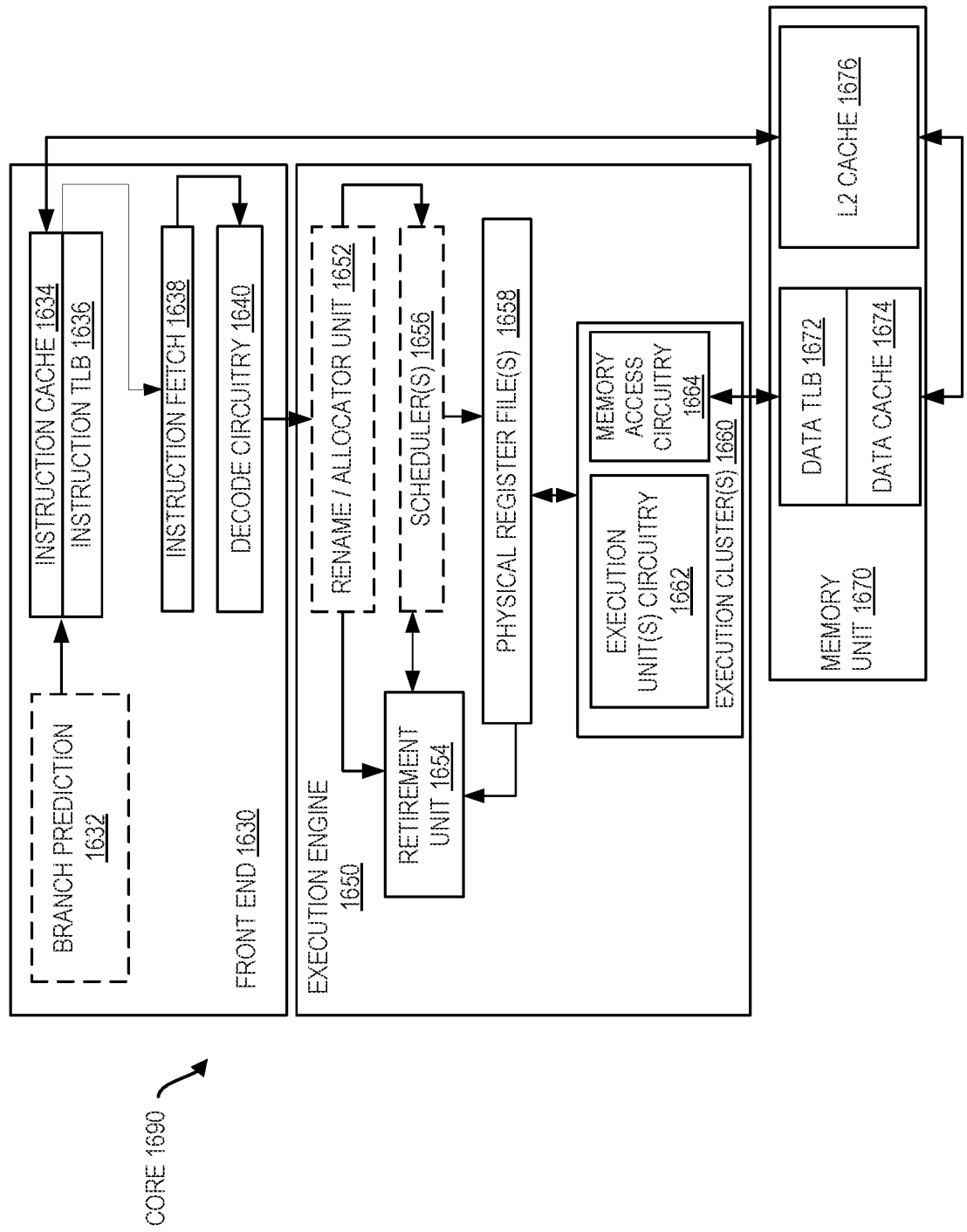
FIG. 16B is a block diagram illustrating both an exemplary example of an in-order architecture core and an exemplary register renaming, out-of-order issue/execution architecture core to be included in a processor according to examples.

FIG. 16A is a block diagram illustrating both an exemplary in-order pipeline and an exemplary register renaming, out-of-order issue/execution pipeline according to examples. FIG. 16B is a block diagram illustrating both an exemplary example of an in-order architecture core and an exemplary register renaming, out-of-order issue/execution architecture core to be included in a processor according to examples. The solid lined boxes in FIGS. 16A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, an optional length decoding stage 1604, a decode stage 1606, an optional allocation (Alloc) stage 1608, an optional renaming stage 1610, a schedule (also known as a dispatch or issue) stage 1612, an optional register read/memory read stage 1614, an execute stage 1616, a write back/memory write stage 1618, an optional exception handling stage 1622, and an optional commit stage 1624. One or more operations can be performed in each of these processor pipeline stages. For example, during the fetch stage 1602, one or more instructions are fetched from instruction memory, and during the decode stage 1606, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1606 and the register read/memory read stage 1614 may be combined into one pipeline stage. In one example, during the execute stage 1616, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution architecture core of FIG. 16B may implement the pipeline 1600 as follows: 1) the instruction fetch circuitry 1638 performs the fetch and length decoding stages 1602 and 1604; 2) the decode circuitry 1640 performs the decode stage 1606; 3) the rename/allocator unit circuitry 1652 performs the allocation stage 1608 and renaming stage 1610; 4) the scheduler(s) circuitry 1656 performs the schedule stage 1612; 5) the physical register file(s) circuitry 1658 and the memory unit circuitry 1670 perform the register read/memory read stage 1614; the execution cluster(s) 1660 perform the execute stage 1616; 6) the memory unit circuitry 1670 and the physical register file(s) circuitry 1658 perform the write back/memory write stage 1618; 7) various circuitry may be involved in the exception handling stage 1622; and 8) the retirement unit circuitry 1654 and the physical register file(s) circuitry 1658 perform the commit stage 1624.

FIG. 16B shows a processor core 1690 including front-end unit circuitry 1630 coupled to an execution engine unit circuitry 1650, and both are coupled to a memory unit circuitry 1670. The core 1690 may be a reduced instruction set architecture computing (RISC) core, a complex instruction set architecture computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like.

The front end unit circuitry 1630 may include branch prediction circuitry 1632 coupled to an instruction cache circuitry 1634, which is coupled to an instruction translation lookaside buffer (TLB) 1636, which is coupled to instruction fetch circuitry 1638, which is coupled to decode circuitry 1640. In one example, the instruction cache circuitry 1634 is included in the memory unit circuitry 1670 rather than the front-end circuitry 1630. The decode circuitry 1640 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1640 may further include an address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1640 may be implemented using various different mechanisms. Examples of suitable mechanisms include, but are not limited to, look-up tables, hardware implementations, programmable logic arrays (PLAs), microcode read only memories (ROMs), etc. In one example, the core 1690 includes a microcode ROM (not shown) or other medium that stores microcode for certain macroinstructions (e.g., in decode circuitry 1640 or otherwise within the front end circuitry 1630). In one example, the decode circuitry 1640 includes a micro-operation (micro-op) or operation cache (not shown) to hold/cache decoded operations, micro-tags, or micro-operations generated during the decode or other stages of the processor pipeline 1600. The decode circuitry 1640 may be coupled to rename/allocator unit circuitry 1652 in the execution engine circuitry 1650.

The execution engine circuitry 1650 includes the rename/allocator unit circuitry 1652 coupled to a retirement unit circuitry 1654 and a set of one or more scheduler(s) circuitry 1656. The scheduler(s) circuitry 1656 represents any number of different schedulers, including reservations stations, central instruction window, etc. In some examples, the scheduler(s) circuitry 1656 can include arithmetic logic unit (ALU) scheduler/scheduling circuitry, ALU queues, arithmetic generation unit (AGU) scheduler/scheduling circuitry, AGU queues, etc. The scheduler(s) circuitry 1656 is coupled to the physical register file(s) circuitry 1658. Each of the physical register file(s) circuitry 1658 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1658 includes vector registers unit circuitry, writemask registers unit circuitry, and scalar register unit circuitry. These register units may provide architectural vector registers, vector mask registers, general-purpose registers, etc. The physical register file(s) circuitry 1658 is coupled to the retirement unit circuitry 1654 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1654 and the physical register file(s) circuitry 1658 are coupled to the execution cluster(s) 1660. The execution cluster(s) 1660 includes a set of one or more execution unit(s) circuitry 1662 and a set of one or more memory access circuitry 1664. The execution unit(s) circuitry 1662 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1656, physical register file(s) circuitry 1658, and execution cluster(s) 1660 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1664). It should also be understood that where separate pipelines are used, one or more of these pipelines may be out-of-order issue/execution and the rest in-order.

In some examples, the execution engine unit circuitry 1650 may perform load store unit (LSU) address/data pipelining to an Advanced Microcontroller Bus (AMB) interface (not shown), and address phase and writeback, data phase load, store, and branches.

The set of memory access circuitry 1664 is coupled to the memory unit circuitry 1670, which includes data TLB circuitry 1672 coupled to a data cache circuitry 1674 coupled to a level 2 (L2) cache circuitry 1676. In one exemplary example, the memory access circuitry 1664 may include a load unit circuitry, a store address unit circuit, and a store data unit circuitry, each of which is coupled to the data TLB circuitry 1672 in the memory unit circuitry 1670. The instruction cache circuitry 1634 is further coupled to the level 2 (L2) cache circuitry 1676 in the memory unit circuitry 1670. In one example, the instruction cache 1634 and the data cache 1674 are combined into a single instruction and data cache (not shown) in L2 cache circuitry 1676, a level 3 (L3) cache circuitry (not shown), and/or main memory. The L2 cache circuitry 1676 is coupled to one or more other levels of cache and eventually to a main memory.

The core 1690 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1690 includes logic to support a packed data instruction set architecture extension (e.g., AVX1, AVX2), thereby allowing the operations used by many multimedia applications to be performed using packed data.

Exemplary Execution Unit(s) Circuitry.

Figure 17:
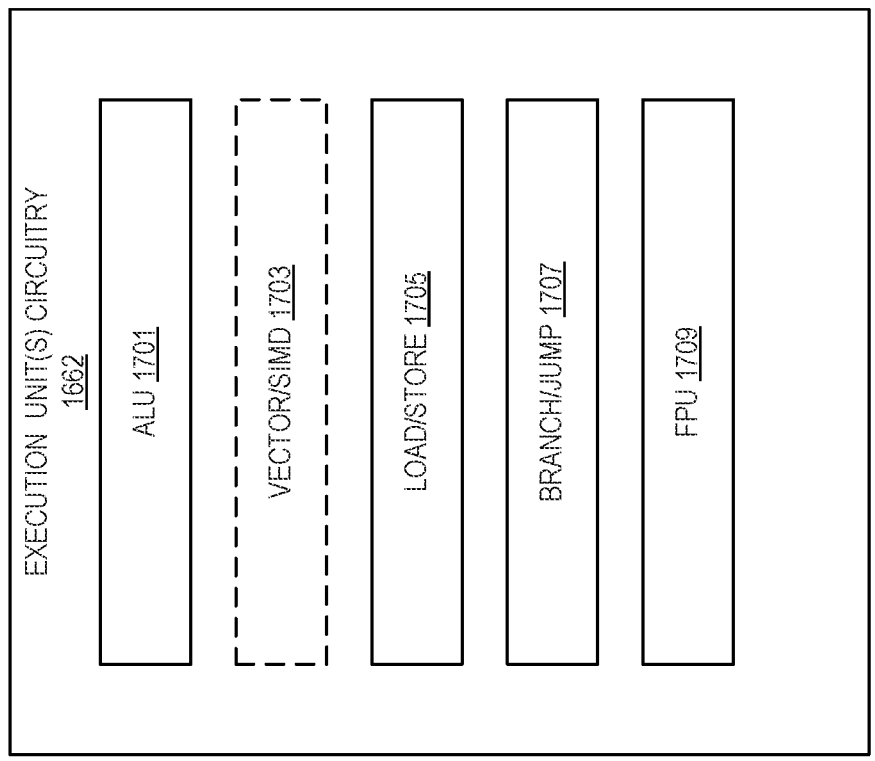
FIG. 17 illustrates examples of execution unit(s) circuitry.

FIG. 17 illustrates examples of execution unit(s) circuitry, such as execution unit(s) circuitry 1662 of FIG. 16B. As illustrated, execution unit(s) circuitry 1662 may include one or more ALU circuits 1701, optional vector/single instruction multiple data (SIMD) circuits 1703, load/store circuits 1705, branch/jump circuits 1707, and/or Floating-point unit (FPU) circuits 1709. ALU circuits 1701 perform integer arithmetic and/or Boolean operations. Vector/SIMD circuits 1703 perform vector/SIMD operations on packed data (such as SIMD/vector registers). Load/store circuits 1705 execute load and store instructions to load data from memory into registers or store from registers to memory. Load/store circuits 1705 may also generate addresses. Branch/jump circuits 1707 cause a branch or jump to a memory address depending on the instruction. FPU circuits 1709 perform floating-point arithmetic. The width of the execution unit(s) circuitry 1662 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Exemplary Register Architecture

Figure 18:
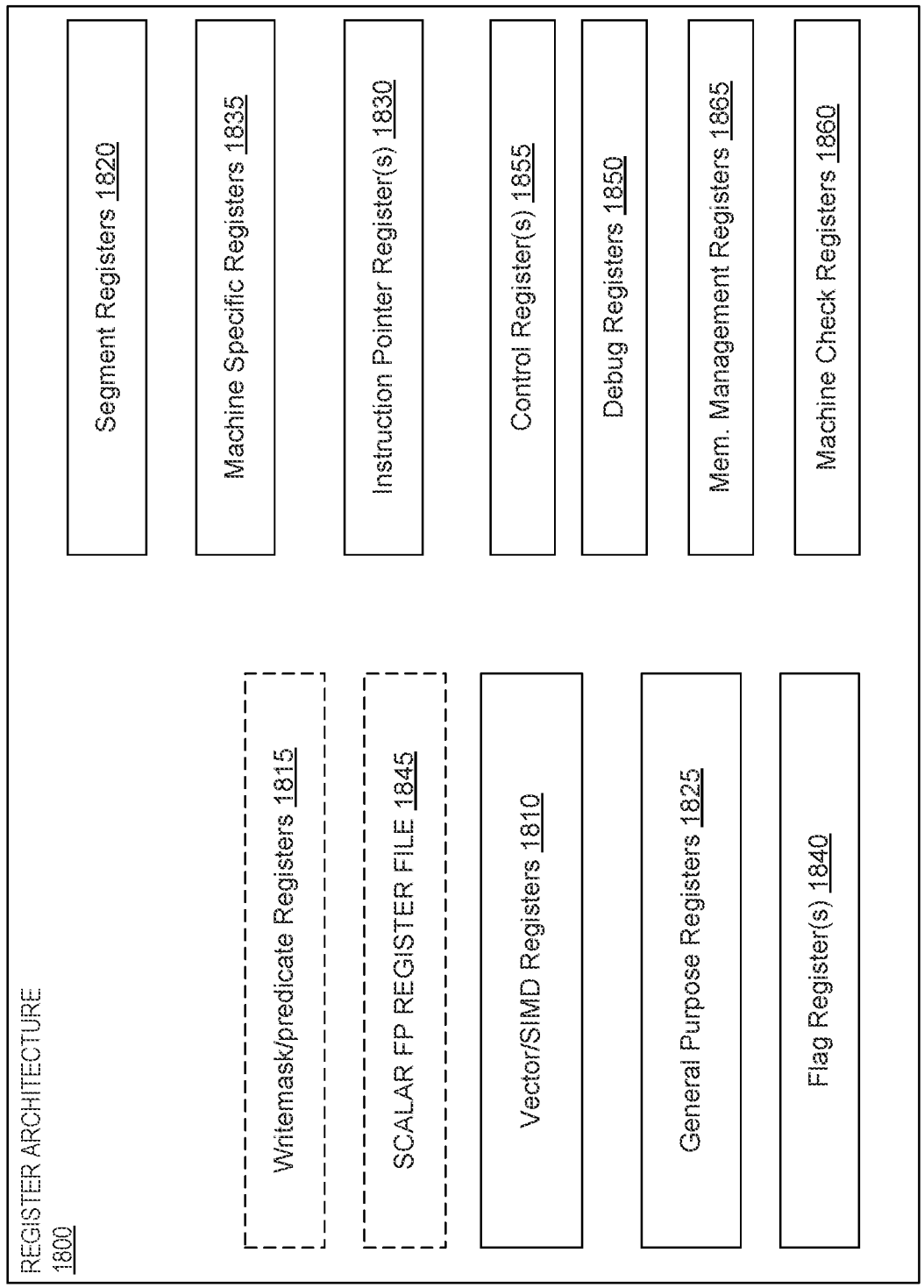
FIG. 18 is a block diagram of a register architecture according to some examples.

FIG. 18 is a block diagram of a register architecture 1800 according to some examples. As illustrated, the register architecture 1800 includes vector/SIMD registers 1810 that vary from 128-bit to 1,024 bits width. In some examples, the vector/SIMD registers 1810 are physically 512-bits and, depending upon the mapping, only some of the lower bits are used. For example, in some examples, the vector/SIMD registers 1810 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1800 includes writemask/predicate registers 1815. For example, in some examples, there are 8 writemask/predicate registers (sometimes called k0 through k7) that are each 16-bit, 32-bit, 64-bit, or 128-bit in size. Writemask/predicate registers 1815 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1815 corresponds to a data element position of the destination. In other examples, the writemask/predicate registers 1815 are scalable and consists of a set number of enable bits for a given vector element (e.g., 8 enable bits per 64-bit vector element).

The register architecture 1800 includes a plurality of general-purpose registers 1825. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1800 includes scalar floating-point (FP) register 1845 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1840 (e.g., EFLAGS, RFLAGS, etc.) store status and control information for arithmetic, compare, and system operations. For example, the one or more flag registers 1840 may store condition code information such as carry, parity, auxiliary carry, zero, sign, and overflow. In some examples, the one or more flag registers 1840 are called program status and control registers.

Segment registers 1820 contain segment points for use in accessing memory. In some examples, these registers are referenced by the names CS, DS, SS, ES, FS, and GS.

Machine specific registers (MSRs) 1835 control and report on processor performance. Most MSRs 1835 handle system-related functions and are not accessible to an application program. Machine check registers 1860 consist of control, status, and error reporting MSRs that are used to detect and report on hardware errors.

One or more instruction pointer register(s) 1830 store an instruction pointer value. Control register(s) 1855 (e.g., CR0-CR4) determine the operating mode of a processor (e.g., processor 1470, 1480, 1438, 1415, and/or 1500) and the characteristics of a currently executing task. Debug registers 1850 control and allow for the monitoring of a processor or core's debugging operations.

Memory (mem) management registers 1865 specify the locations of data structures used in protected mode memory management. These registers may include a GDTR, IDRT, task register, and a LDTR register.

Alternative examples may use wider or narrower registers. Additionally, alternative examples may use more, less, or different register files and registers. The register architecture 1800 may, for example, be used in a register file/memory, or physical register file(s) circuitry 1658.

Emulation (Including Binary Translation, Code Morphing, Etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 19 illustrates a block diagram contrasting the use of a software instruction converter to convert binary instructions in a source instruction set architecture to binary instructions in a target instruction set architecture according to examples. In the illustrated example, the instruction converter is a software instruction converter, although alternatively the instruction converter may be implemented in software, firmware, hardware, or various combinations thereof. FIG. 19 shows a program in a high-level language 1902 may be compiled using a first ISA compiler 1904 to generate first ISA binary code 1906 that may be natively executed by a processor with at least one first instruction set architecture core 1916. The processor with at least one first ISA instruction set architecture core 1916 represents any processor that can perform substantially the same functions as an Intel® processor with at least one first ISA instruction set architecture core by compatibly executing or otherwise processing (1) a substantial portion of the instruction set architecture of the first ISA instruction set architecture core or (2) object code versions of applications or other software targeted to run on an Intel processor with at least one first ISA instruction set architecture core, in order to achieve substantially the same result as a processor with at least one first ISA instruction set architecture core. The first ISA compiler 1904 represents a compiler that is operable to generate first ISA binary code 1906 (e.g., object code) that can, with or without additional linkage processing, be executed on the processor with at least one first ISA instruction set architecture core 1916. Similarly, FIG. 19 shows the program in the high-level language 1902 may be compiled using an alternative instruction set architecture compiler 1908 to generate alternative instruction set architecture binary code 1910 that may be natively executed by a processor without a first ISA instruction set architecture core 1914. The instruction converter 1912 is used to convert the first ISA binary code 1906 into code that may be natively executed by the processor without a first ISA instruction set architecture core 1914. This converted code is not necessarily to be the same as the alternative instruction set architecture binary code 1910; however, the converted code will accomplish the general operation and be made up of instructions from the alternative instruction set architecture. Thus, the instruction converter 1912 represents software, firmware, hardware, or a combination thereof that, through emulation, simulation or any other process, allows a processor or other electronic device that does not have a first ISA instruction set architecture processor or core to execute the first ISA binary code 1906.

Techniques and architectures for HCVT technology are described herein. In the above description, for purposes of explanation, numerous specific details are set forth in order to provide a thorough understanding of certain examples. It will be apparent, however, to one skilled in the art that certain examples can be practiced without these specific details. In other instances, structures and devices are shown in block diagram form in order to avoid obscuring the description

ADDITIONAL NOTES AND EXAMPLES

Example 1 includes an apparatus comprising a cache to store information accessible by two or more cores, and circuitry coupled to the cache to maintain coherence of the information stored in the cache and to hierarchically track respective associations of the information stored in the cache with the two or more cores, wherein a lowest hierarchical level of the hierarchically tracked associations is to indicate a logical core identifier of a particular core of the two or more cores.

Example 2 includes the apparatus of Example 1, wherein the circuitry is further to map one or more upper levels of the hierarchically tracked associations with a software-visible organization of the two or more cores.

Example 3 includes the apparatus of any of Examples 1 to 2, wherein the hierarchically tracked associations are independent of a physical topology of the two or more cores.

Example 4 includes the apparatus of any of Examples 1 to 3, wherein the circuitry is further to maintain a hierarchical data structure to store a tracked association between a line of the cache and the two or more cores, wherein the lowest level of the hierarchical data structure includes a bit vector to indicate one or more logical core identifiers that are associated with the line of the cache.

Example 5 includes the apparatus of Example 4, wherein the hierarchical data structure includes a field to indicate one or more sub-groups of the two or more cores, and wherein the hierarchical data structure is to represent logical core identifiers in the bit vector for a first sub-group in a reverse order as compared to a second sub-group based on a value of the field.

Example 6 includes the apparatus of Example 4, wherein the hierarchical data structure includes a first field to indicate one or more clusters associated with the line of the cache and a second field to indicate, in aggregate, subdivisions of the one or more clusters that have cores associated with the line of the cache.

Example 7 includes the apparatus of any of Examples 1 to 6, wherein the circuitry is further to provide access to the hierarchically tracked associations to one or more snoop filters.

Example 8 includes a method comprising storing information accessible by ten or more cores in a shared cache, hierarchically tracking core ownership of the information stored in the shared cache with respect to the ten or more cores, and indicating a logical core identifier of a particular core of the ten or more cores in a lowest hierarchical level of the hierarchically tracked core ownership.

Example 9 includes the method of Example 8, further comprising maintaining coherence of the information stored in the cache based at least in part on the hierarchically tracked core ownership.

Example 10 includes the method of any of Examples 8 to 9, further comprising mapping one or more upper levels of the hierarchically tracked core ownership to correspond to a software-visible organization of the ten or more cores.

Example 11 includes the method of any of Examples 8 to 10, wherein the hierarchically tracked core ownership is independent of a physical topology of the ten or more cores.

Example 12 includes the method of any of Examples 8 to 11, further comprising storing a representation of the hierarchically tracked core ownership in a data structure that includes an entry for each cache line of the shared cache, wherein an entry of the data structure includes a first field to indicate one or more logical core identifiers that are associated with the cache line.

Example 13 includes the method of Example 12, wherein the entry of the data structure further includes a second field to indicate one or more sub-groups of the ten or more cores, and wherein the first field is to represent logical core identifiers in a bit vector for a first sub-group in a reverse order as compared to logical core identifiers in the bit vector for a second sub-group based on a value of the second field.

Example 14 includes the method of Example 13, wherein the entry of the data structure further includes a third field to indicate one or more clusters associated with the cache line and the second field is to indicate, in aggregate, sub-clusters of the one or more clusters that have cores associated with the cache line.

Example 15 includes the method of any of Examples 8 to 14, further comprising providing access to the hierarchically tracked core ownership to one or more snoop filters.

Example 16 includes an apparatus comprising ten or more cores, a last level cache (LLC), and a cache controller coupled to the ten or more cores and the LLC, wherein the cache controller includes circuitry to maintain a hierarchical data structure to track core ownership of cache lines of the LLC, wherein a lowest hierarchical level of the hierarchical data structure is to indicate a logical core identifier of a particular core of the ten or more cores.

Example 17 includes the apparatus of Example 16, wherein the circuitry is further to maintain a coherence of the LLC based at least in part on the hierarchical data structure.

Example 18 includes the apparatus of any of Examples 16 to 17, wherein the hierarchical data structure includes an entry for each cache line of the LLC, and wherein an entry of the hierarchical data structure includes a bit vector to indicate one or more logical core identifiers that are associated with the cache line.

Example 19 includes the apparatus of Example 18, wherein the entry of the hierarchical data structure further includes a field to indicate one or more sub-groups of the ten or more cores, and wherein the bit vector is to represent logical core identifiers for a first sub-group in a reverse order as compared to a second sub-group based on a value of the field.

Example 20 includes the apparatus of any of Examples 18 to 19, wherein the entry of the hierarchical data structure further includes a first field to indicate one or more clusters associated with the cache line and a second field to indicate, in aggregate, sub-clusters of the one or more clusters that have cores associated with the cache line.

Example 21 includes the apparatus of any of Examples 16 to 20, wherein the circuitry is further to provide one or more snoop filters access to the hierarchical data structure.

Example 22 includes an apparatus comprising means for storing information accessible by ten or more cores in a shared cache, means for hierarchically tracking core ownership of the information stored in the shared cache with respect to the ten or more cores, and means for indicating a logical core identifier of a particular core of the ten or more cores in a lowest hierarchical level of the hierarchically tracked core ownership.

Example 23 includes the apparatus of Example 22, further comprising means for maintaining coherence of the information stored in the cache based at least in part on the hierarchically tracked core ownership.

Example 24 includes the apparatus of any of Examples 22 to 23, further comprising means for mapping one or more upper levels of the hierarchically tracked core ownership to correspond to a software-visible organization of the ten or more cores.

Example 25 includes the apparatus of any of Examples 22 to 24, wherein the hierarchically tracked core ownership is independent of a physical topology of the ten or more cores.

Example 26 includes the apparatus of any of Examples 22 to 25, further comprising means for storing a representation of the hierarchically tracked core ownership in a data structure that includes an entry for each cache line of the shared cache, wherein an entry of the data structure includes a first field to indicate one or more logical core identifiers that are associated with the cache line.

Example 27 includes the apparatus of Example 26, wherein the entry of the data structure further includes a second field to indicate one or more sub-groups of the ten or more cores, and wherein the first field is to represent logical core identifiers in a bit vector for a first sub-group in a reverse order as compared to logical core identifiers in the bit vector for a second sub-group based on a value of the second field.

Example 28 includes the apparatus of Example 27, wherein the entry of the data structure further includes a third field to indicate one or more clusters associated with the cache line and the second field is to indicate, in aggregate, sub-clusters of the one or more clusters that have cores associated with the cache line.

Example 29 includes the apparatus of any of Examples 22 to 28, further comprising means for providing access to the hierarchically tracked core ownership to one or more snoop filters.

Example 30 includes at least one non-transitory one machine readable medium comprising a plurality of instructions that, in response to being executed on a computing device, cause the computing device to store information accessible by ten or more cores in a shared cache, hierarchically track core ownership of the information stored in the shared cache with respect to the ten or more cores, and indicate a logical core identifier of a particular core of the ten or more cores in a lowest hierarchical level of the hierarchically tracked core ownership.

Example 31 includes the at least one non-transitory one machine readable medium of Example 30, comprising a plurality of further instructions that, in response to being executed on the computing device, cause the computing device to maintain coherence of the information stored in the cache based at least in part on the hierarchically tracked core ownership.

Example 32 includes the at least one non-transitory one machine readable medium of any of Examples 30 to 31, comprising a plurality of further instructions that, in response to being executed on the computing device, cause the computing device to map one or more upper levels of the hierarchically tracked core ownership to correspond to a software-visible organization of the ten or more cores.

Example 33 includes the at least one non-transitory one machine readable medium of any of Examples 30 to 32, wherein the hierarchically tracked core ownership is independent of a physical topology of the ten or more cores.

Example 34 includes the at least one non-transitory one machine readable medium of any of Examples 30 to 33, comprising a plurality of further instructions that, in response to being executed on the computing device, cause the computing device to store a representation of the hierarchically tracked core ownership in a data structure that includes an entry for each cache line of the shared cache, wherein an entry of the data structure includes a first field to indicate one or more logical core identifiers that are associated with the cache line.

Example 35 includes the at least one non-transitory one machine readable medium of Example 34, wherein the entry of the data structure further includes a second field to indicate one or more sub-groups of the ten or more cores, and wherein the first field is to represent logical core identifiers in a bit vector for a first sub-group in a reverse order as compared to logical core identifiers in the bit vector for a second sub-group based on a value of the second field.

Example 36 includes the at least one non-transitory one machine readable medium of Example 35, wherein the entry of the data structure further includes a third field to indicate one or more clusters associated with the cache line and the second field is to indicate, in aggregate, sub-clusters of the one or more clusters that have cores associated with the cache line.

Example 37 includes the at least one non-transitory one machine readable medium of any of Examples 30 to 36, comprising a plurality of further instructions that, in response to being executed on the computing device, cause the computing device to provide access to the hierarchically tracked core ownership to one or more snoop filters.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain examples also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random-access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain examples are not described with reference to any particular programming language. It will be appreciated that a variety of programming languages may be used to implement the teachings of such examples as described herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
a cache to store information accessible by two or more cores; and
circuitry coupled to the cache to maintain coherence of the information stored in the cache and to hierarchically track respective associations of the information stored in the cache with the two or more cores, wherein a lowest hierarchical level of the hierarchically tracked associations is to indicate a logical core identifier of a particular core of the two or more cores, wherein the circuitry is further to map one or more upper levels of the hierarchically tracked associations with a software-visible organization of the two or more cores.

2. The apparatus of claim 1, wherein the hierarchically tracked associations are independent of a physical topology of the two or more cores.

3. The apparatus of claim 1, wherein the circuitry is to:
maintain a hierarchical data structure to store a tracked association between a line of the cache and the two or more cores, wherein a lowest level of the hierarchical data structure includes a bit vector to indicate one or more logical core identifiers that are associated with the line of the cache.

4. The apparatus of claim 3, wherein the hierarchical data structure includes a field to indicate one or more sub-groups of the two or more cores, and wherein the hierarchical data structure is to represent logical core identifiers in the bit vector for a first sub-group in a reverse order as compared to a second sub-group based on a value of the field.

5. The apparatus of claim 3, wherein the hierarchical data structure includes a first field to indicate one or more clusters associated with the line of the cache and a second field to indicate, in aggregate, subdivisions of the one or more clusters that have cores associated with the line of the cache.

6. The apparatus of claim 1, wherein the circuitry is further to:
provide access to the hierarchically tracked associations to one or more snoop filters.

7. A method comprising:
storing information accessible by ten or more cores in a shared cache;
hierarchically tracking core ownership of the information stored in the shared cache with respect to the ten or more cores;
indicating a logical core identifier of a particular core of the ten or more cores in a lowest hierarchical level of the hierarchically tracked core ownership; and
mapping one or more upper levels of the hierarchically tracked core ownership to correspond to a software-visible organization of the ten or more cores.

8. The method of claim 7, further comprising:
maintaining coherence of the information stored in the shared cache based at least in part on the hierarchically tracked core ownership.

9. The method of claim 7, wherein the hierarchically tracked core ownership is independent of a physical topology of the ten or more cores.

10. The method of claim 7, further comprising:
storing a representation of the hierarchically tracked core ownership in a data structure that includes entries each for a respective cache line of the shared cache, wherein a first entry of the entries includes a first field to indicate one or more logical core identifiers that are associated with a first cache line of the shared cache.

11. The method of claim 10, wherein the first entry further includes a second field to indicate one or more sub-groups of the ten or more cores, and wherein the first field is to represent logical core identifiers in a bit vector for a first sub-group in a reverse order as compared to logical core identifiers in the bit vector for a second sub-group based on a value of the second field.

12. The method of claim 11, wherein the first entry further includes a third field to indicate one or more clusters associated with the cache line and the second field is to indicate, in aggregate, sub-clusters of the one or more clusters that have cores associated with the cache line.

13. The method of claim 7, further comprising:
providing access to the hierarchically tracked core ownership to one or more snoop filters.

14. An apparatus comprising:
ten or more cores;
a last level cache (LLC); and
a cache controller coupled to the ten or more cores and the LLC, wherein the cache controller includes circuitry to maintain a hierarchical data structure to track core ownership of cache lines of the LLC, wherein a lowest hierarchical level of the hierarchical data structure is to indicate a logical core identifier of a particular core of the ten or more cores;
wherein:
the hierarchical data structure includes entries each for a respective cache line of the LLC, and wherein a first entry of the entries includes a bit vector to indicate one or more logical core identifiers that are associated with a first cache line of the LLC.

15. The apparatus of claim 14, wherein the circuitry is further to:
maintain a coherence of the LLC based at least in part on the hierarchical data structure.

16. The apparatus of claim 14, wherein the first entry further includes a field to indicate one or more sub-groups of the ten or more cores, and wherein the bit vector is to represent logical core identifiers for a first sub-group in a reverse order as compared to a second sub-group based on a value of the field.

17. The apparatus of claim 14, wherein the first entry further includes a first field to indicate one or more clusters associated with the cache line and a second field to indicate, in aggregate, sub-clusters of the one or more clusters that have cores associated with the cache line.

18. The apparatus of claim 14, wherein the circuitry is further to:
provide one or more snoop filters access to the hierarchical data structure.

* * * * *